(12) United States Patent
Yamaguchi et al.

(10) Patent No.: US 7,778,354 B2
(45) Date of Patent: Aug. 17, 2010

(54) COMMUNICATING APPARATUS, METHOD OF CALCULATING SET VALUE OF ORTHOGONAL ERROR COMPENSATION AND ORTHOGONAL ERROR COMPENSATION PROGRAM

(75) Inventors: Keiichi Yamaguchi, Kawasaki (JP); Atsushi Yamaoka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 672 days.

(21) Appl. No.: 11/689,098

(22) Filed: Mar. 21, 2007

(65) Prior Publication Data

US 2008/0025435 A1 Jan. 31, 2008

(30) Foreign Application Priority Data

Jul. 12, 2006 (JP) ............................ P2006-191784

(51) Int. Cl.
H04L 27/36 (2006.01)
(52) U.S. Cl. ........................ 375/298; 375/219; 375/222; 375/261; 375/268; 375/269; 375/295; 375/300; 375/302; 329/304; 329/306
(58) Field of Classification Search ................. 375/219, 375/222, 261, 268, 269, 295, 298, 300, 302; 329/304, 306
See application file for complete search history.

(56) References Cited

U.S. PATENT DOCUMENTS 5,771,263 A * 6/1998 Kanazawa et al. .......... 375/261

| 6,384,677 B2 * | 5/2002 | Yamamoto ................ 330/10 |
| 6,940,916 B1 * | 9/2005 | Warner et al. .............. 375/261 |
| 2006/0109893 A1 * | 5/2006 | Chen et al. ................. 375/219 |

FOREIGN PATENT DOCUMENTS

| JP | 3198864 | 9/1996 |
| JP | 2000-270037 | 9/2000 |
| JP | 2003-309615 | 10/2003 |

\* cited by examiner

*Primary Examiner*—David C Payne
*Assistant Examiner*—Leon Flores
(74) *Attorney, Agent, or Firm*—Turocy & Watson, LLP

(57) ABSTRACT

A communicating apparatus includes: a local signal generator, an orthogonal modulator, an orthogonal demodulator, and two orthogonal error compensators. The local signal generator generates a first local signal and a second local signal. The orthogonal modulator modulates an input signal into a modulation signal by using the first local signal. The orthogonal demodulator demodulates the modulation signal into a demodulation signal by using the second local signal. Each of the two orthogonal error compensators corrects orthogonal modulation error generated in the orthogonal modulator and an orthogonal demodulation error generated in the orthogonal demodulator respectively. Set values to be set to the orthogonal error compensators are calculated based on (1) a phase difference between the first local signal and the second local signal, (2) the input signal and (3) the demodulation signal.

11 Claims, 30 Drawing Sheets

MAPPING OF MODULATION DATA

ORTHOGONAL MODULATOR

ORTHOGONAL DEMODULATOR

MAPPING OF DEMODULATION DATA

MAPPING OF MODULATION DATA

ORTHOGONAL MODULATOR

ORTHOGONAL DEMODULATOR

MAPPING OF DEMODULATION DATA

FIG. 7F
FIG. 7A
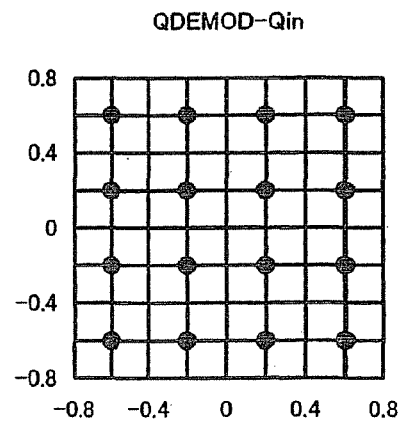
FIG. 7B
FIG. 7C
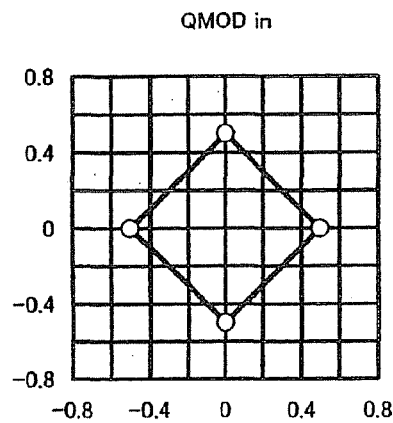
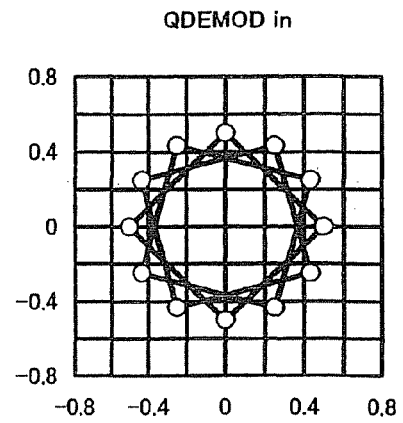
FIG. 7D
FIG. 7E
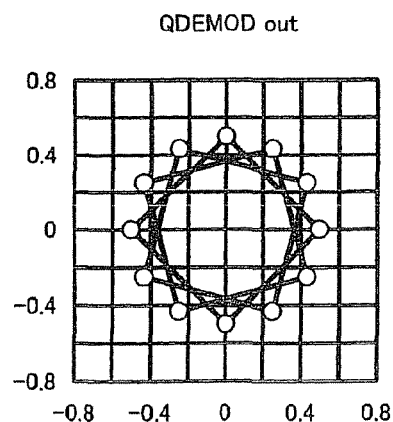
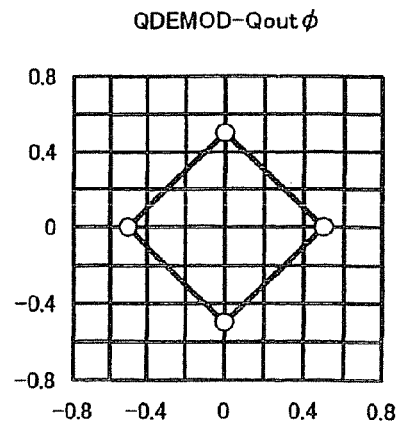

FIG. 8F
| | | | |
|---|---|---|---|
| QMOD | Ich DCoffset | 0.1 | [V] |
| | Qch DCoffset | 0.2 | [V] |
| | Gain error | 0 | [dB] |
| | Phase error | 0 | [deg] |
| QDEMOD | Ich DCoffset | 0 | [V] |
| | Qch DCoffset | 0 | [V] |
| | Gain error | 0 | [dB] |
| | Phase error | 0 | [deg] |
FIG. 8A
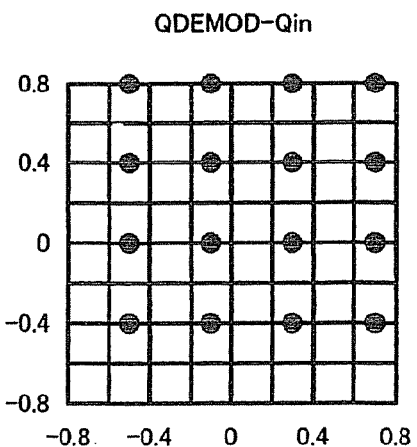
QDEMOD-Qin
FIG. 8B
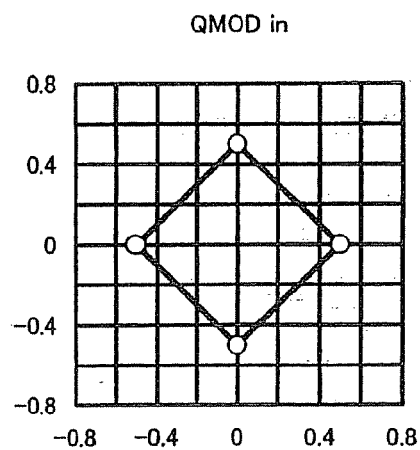
QMOD in
FIG. 8C
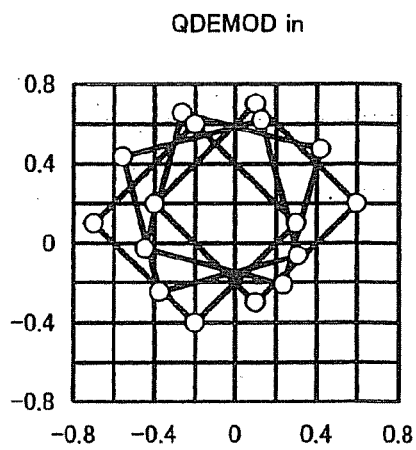
QDEMOD in
FIG. 8D
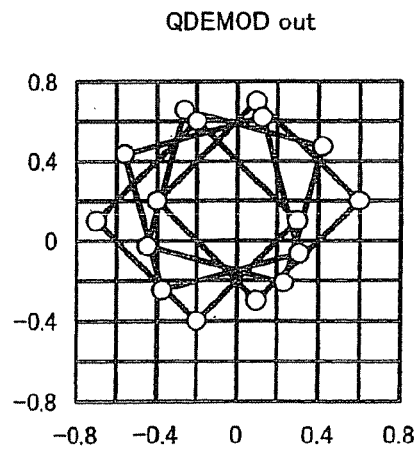
QDEMOD out
FIG. 8E
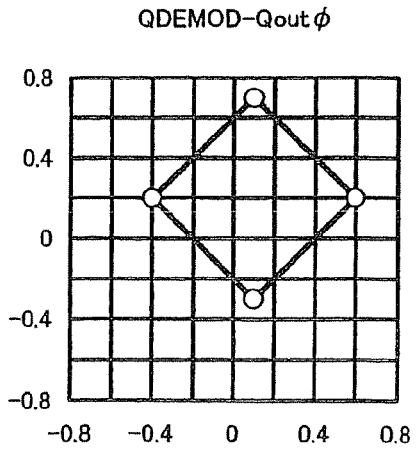
QDEMOD-Qout φ

FIG. 9F
FIG. 9A
QDEMOD-Qin
| QMOD | Ich DCoffset | 0 | [V] |
| | Qch DCoffset | 0 | [V] |
| | Gain error | 0 | [dB] |
| | Phase error | 0 | [deg] |
| QDEMOD | Ich DCoffset | −0.1 | [V] |
| | Qch DCoffset | −0.2 | [V] |
| | Gain error | 0 | [dB] |
| | Phase error | 0 | [deg] |
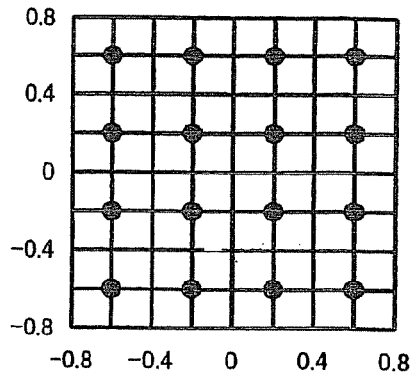
FIG. 9B
QMOD in
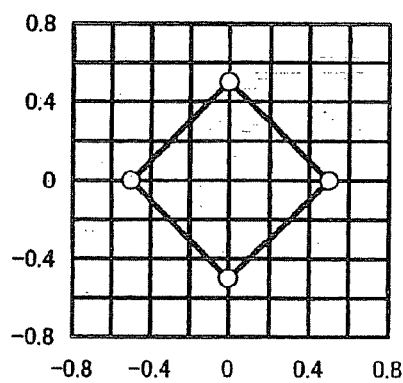
FIG. 9C
QDEMOD in
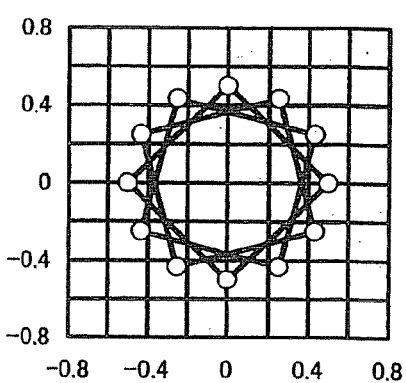
FIG. 9D
QDEMOD out
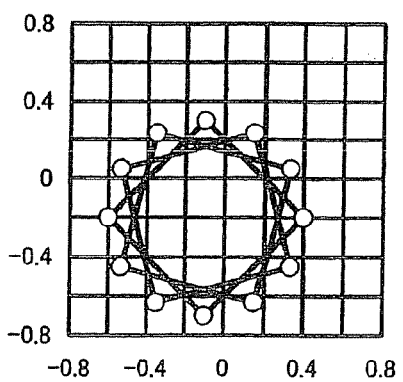
FIG. 9E
QDEMOD-Qout φ
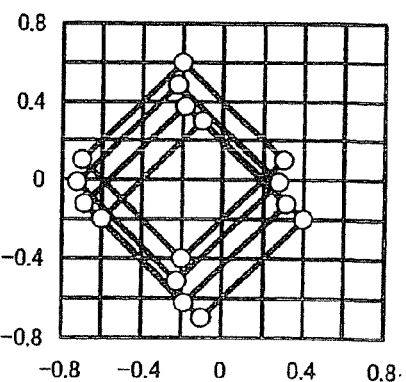

FIG. 10F
| | Ich DCoffset | 0.1 | [V] |
|---|---|---|---|
| QMOD | Qch DCoffset | 0.2 | [V] |
| | Gain error | 0 | [dB] |
| | Phase error | 0 | [deg] |
| | Ich DCoffset | −0.1 | [V] |
| QDEMOD | Qch DCoffset | −0.2 | [V] |
| | Gain error | 0 | [dB] |
| | Phase error | 0 | [deg] |
FIG. 10A
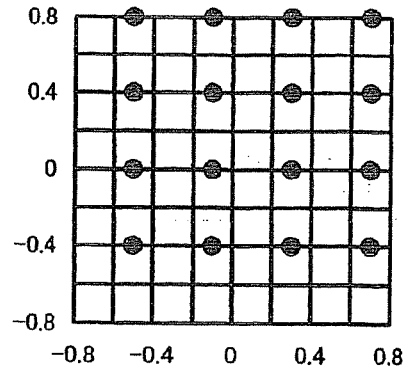
FIG. 10B
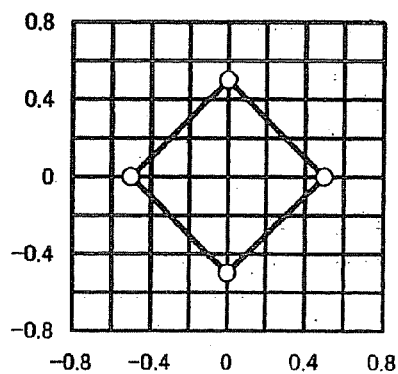
FIG. 10C
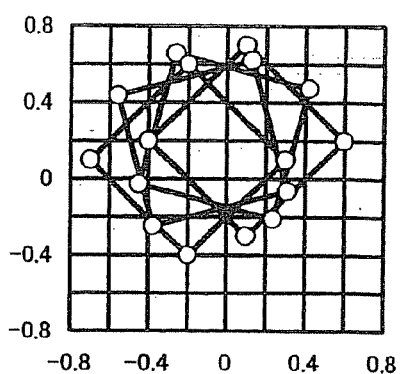
FIG. 10D
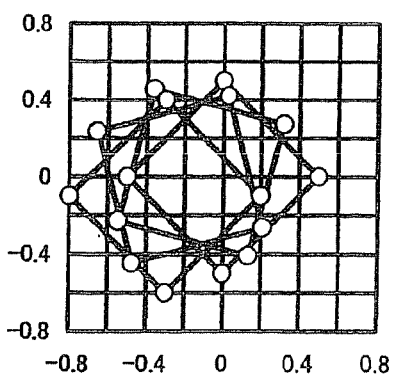
FIG. 10E
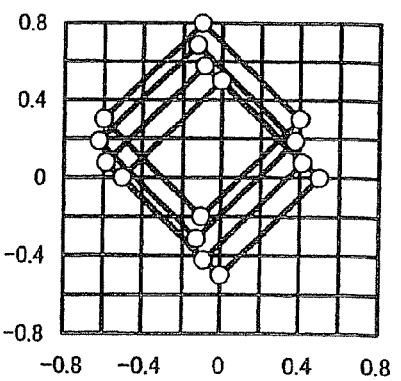

FIG. 11F
| | | | |
|---|---|---|---|
| QMOD | Ich DCoffset | 0 | [V] |
| | Qch DCoffset | 0 | [V] |
| | Gain error | 1 | [dB] |
| | Phase error | 0 | [deg] |
| QDEMOD | Ich DCoffset | 0 | [V] |
| | Qch DCoffset | 0 | [V] |
| | Gain error | 0 | [dB] |
| | Phase error | 0 | [deg] |
FIG. 11A
QDEMOD-Qin
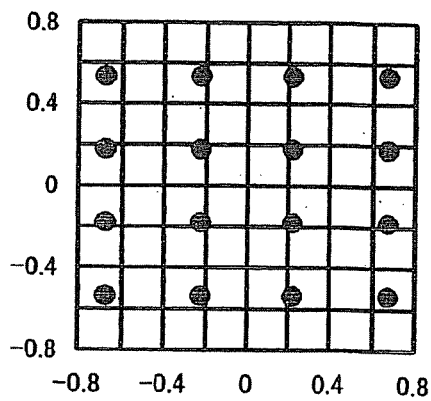
FIG. 11B
QMOD in
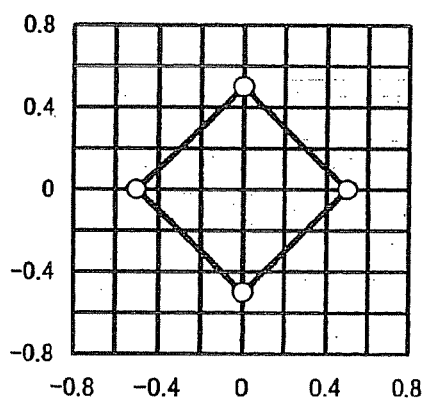
FIG. 11C
QDEMOD in
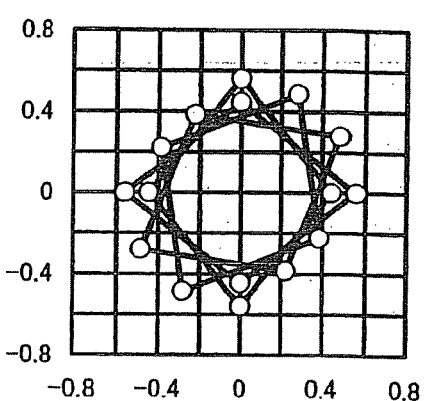
FIG. 11D
QDEMOD out
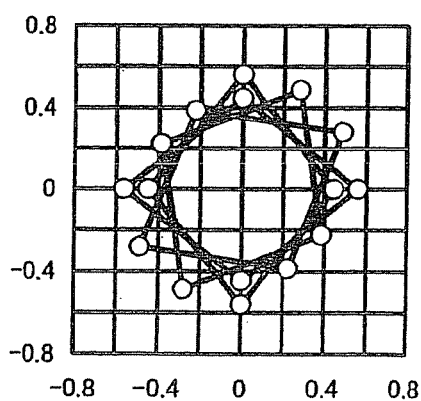
FIG. 11E
QDEMOD-Qout $\phi$
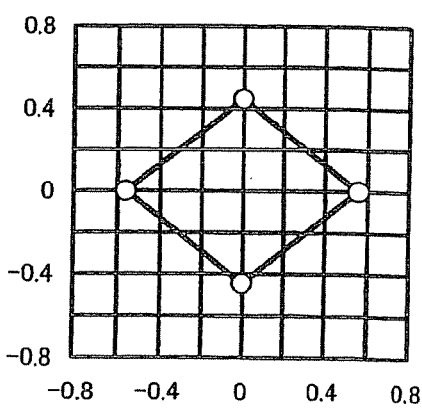

FIG. 12F
FIG. 12A QDEMOD-Qin
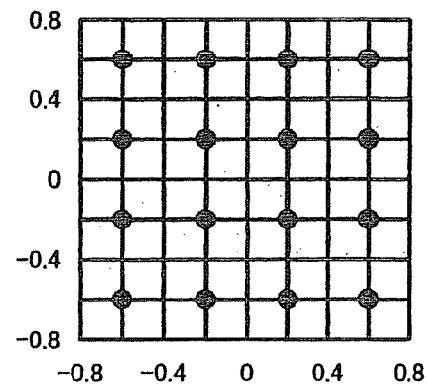
FIG. 12B QMOD in
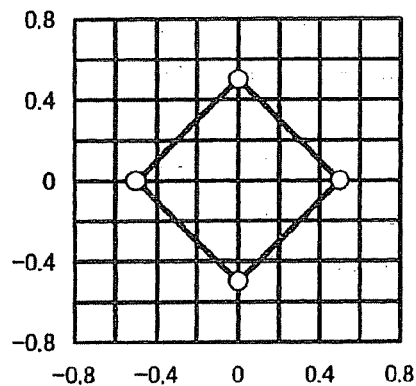
FIG. 12C QDEMOD in
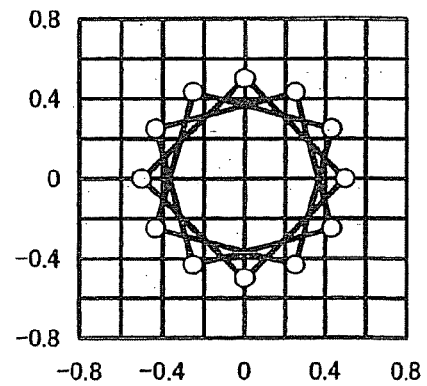
FIG. 12D QDEMOD out
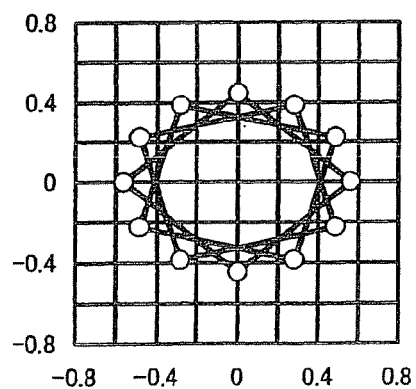
FIG. 12E QDEMOD-Qout φ
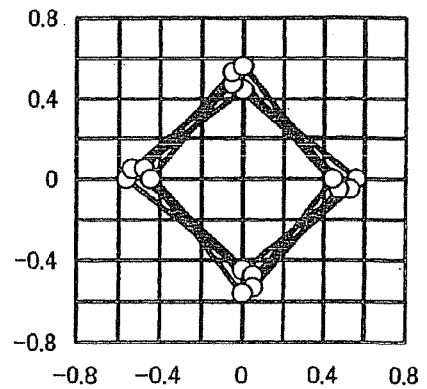
| QMOD | Ich DCoffset | 0 | [V] |
|---|---|---|---|
| | Qch DCoffset | 0 | [V] |
| | Gain error | 0 | [dB] |
| | Phase error | 0 | [deg] |
| QDEMOD | Ich DCoffset | 0 | [V] |
| | Qch DCoffset | 0 | [V] |
| | Gain error | 1 | [dB] |
| | Phase error | 0 | [deg] |

FIG. 13F
| | | | |
|---|---|---|---|
| QMOD | Ich DCoffset | 0 | [V] |
| | Qch DCoffset | 0 | [V] |
| | Gain error | 0 | [dB] |
| | Phase error | 10 | [deg] |
| QDEMOD | Ich DCoffset | 0 | [V] |
| | Qch DCoffset | 0 | [V] |
| | Gain error | 0 | [dB] |
| | Phase error | 0 | [deg] |
FIG. 13A
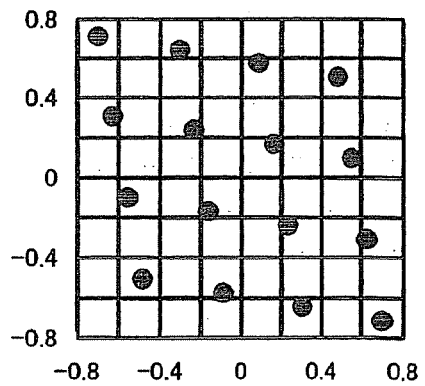
QDEMOD-Qin
FIG. 13B
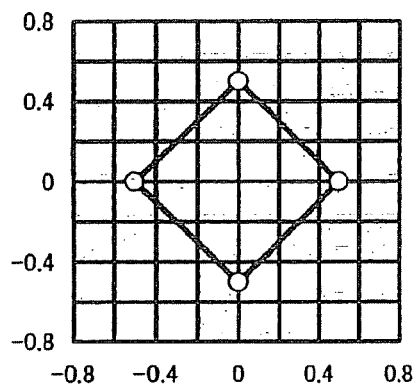
QMOD in
FIG. 13C
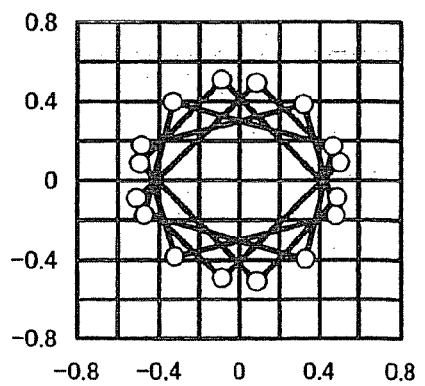
QDEMOD in
FIG. 13D
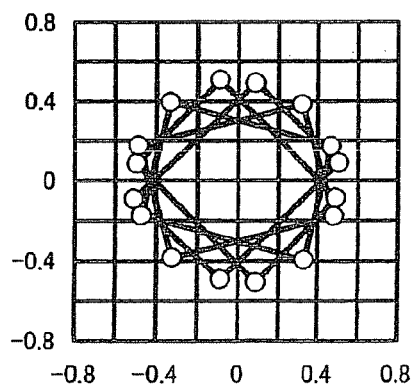
QDEMOD out
FIG. 13E
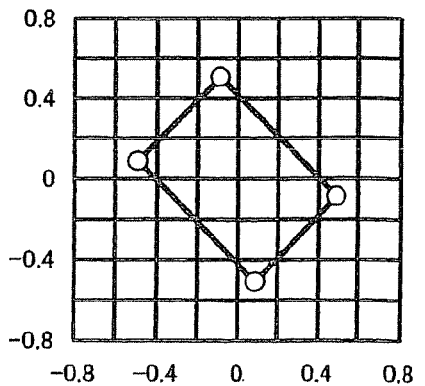
QDEMOD-Qout φ

FIG. 14F
FIG. 14A
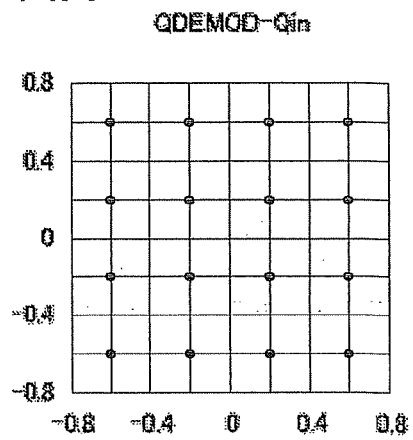
FIG. 14B
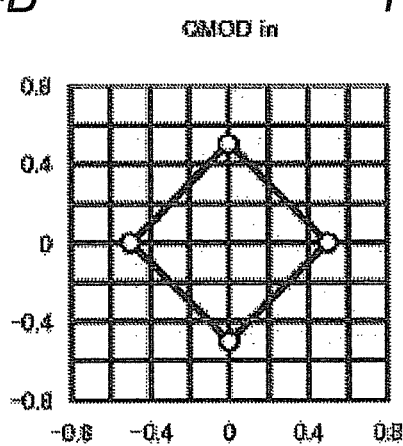
FIG. 14C
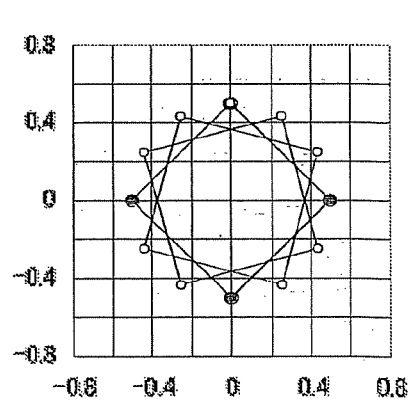
FIG. 14D
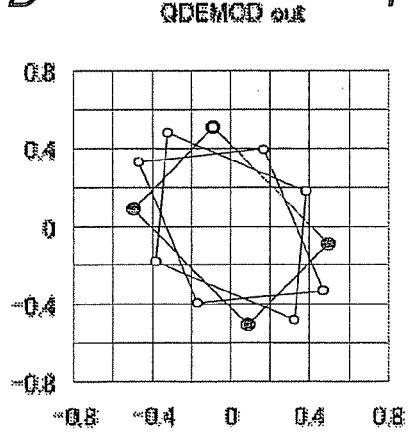
FIG. 14E
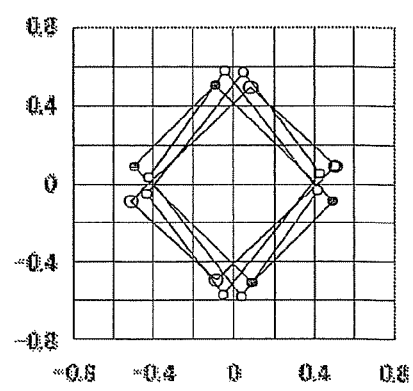

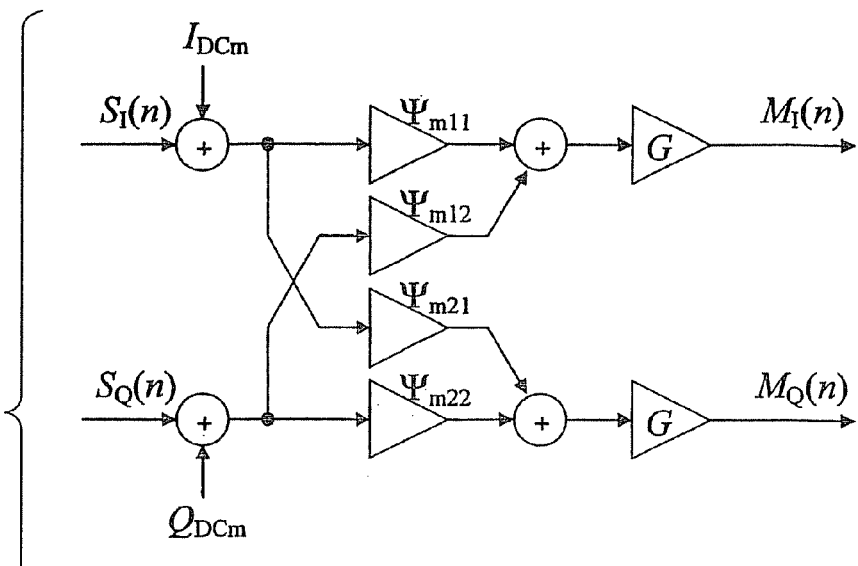

FIG. 15

$$\Psi_m = \begin{bmatrix} \Delta g_m \cos \Delta \theta_m & \dfrac{1}{\Delta g_m} \sin \Delta \theta_m \\ \Delta g_m \sin \Delta \theta_m & \dfrac{1}{\Delta g_m} \cos \Delta \theta_m \end{bmatrix}$$

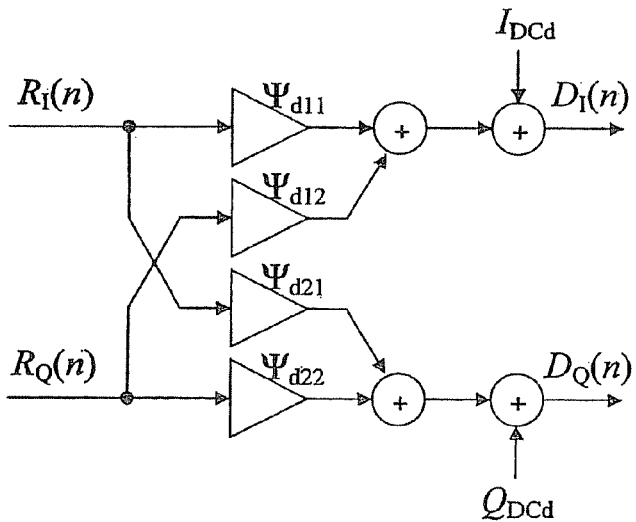

FIG. 16

$$\Psi_d = \begin{bmatrix} \Delta g_d \cos \Delta \theta_d & \dfrac{1}{\Delta g_d} \sin \Delta \theta_d \\ \Delta g_d \sin \Delta \theta_d & \dfrac{1}{\Delta g_d} \cos \Delta \theta_d \end{bmatrix}$$

FIG. 19
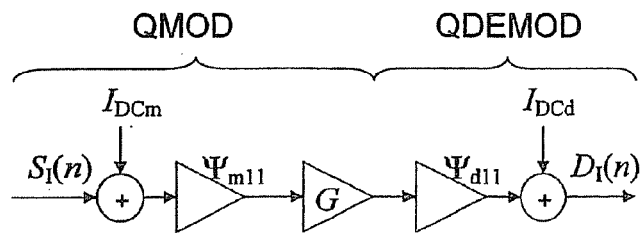
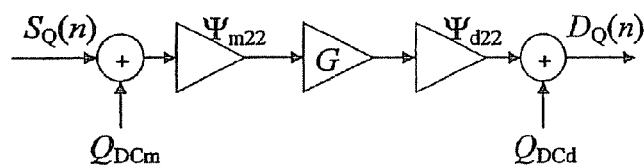
FIG. 20
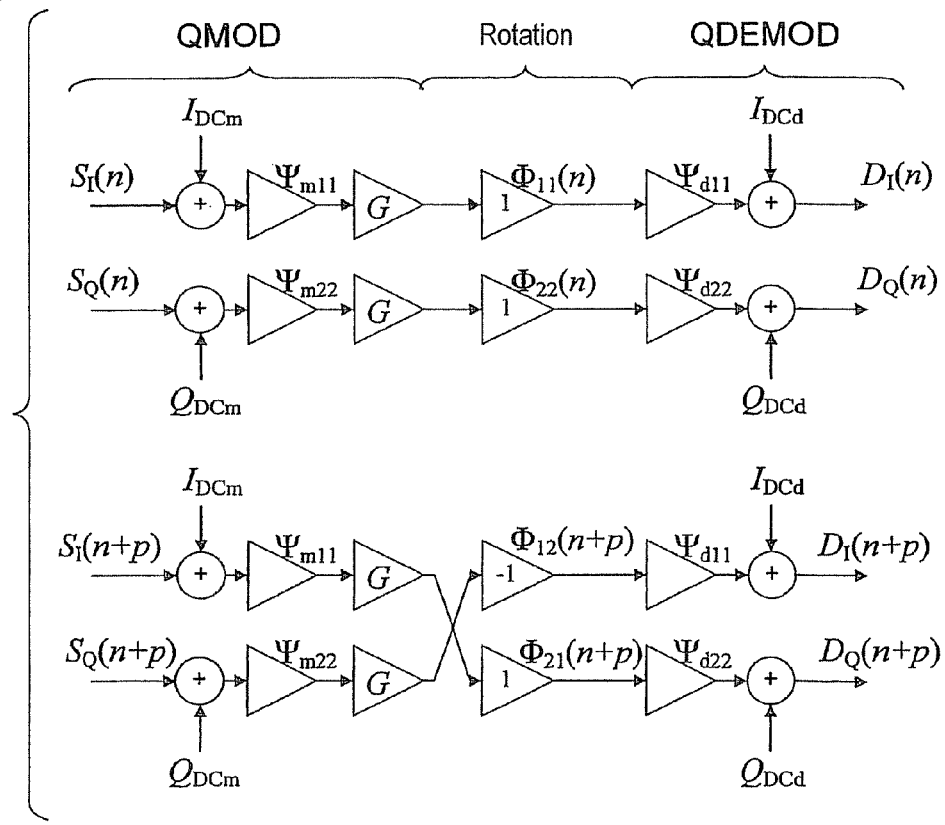

FIG. 24

| | |
|---|---|
| PARAMETER GENERATING METHOD | RANGE LIMITING HOMOGENEOUS RANDOM NUMBER |
| NUMBER OF TRIALS M | 20 |
| NUMBER OF DIVISIONS D OF PHASE SHIFTER | 2 (0 DEGREE, 90 DEGREE) |
| NUMBER OF GENERATED PARAMETERS/TRIAL R | 8192 |
| NUMBER OF SAMPLES/ONE SET OF PARAMETER N | 1024 |
| ORTHOGONAL MODULATOR AMPLITUDE ERROR | 0.25 [dB] |
| ORTHOGONAL MODULATOR PHASE ERROR | 0.3 [deg] |
| ORTHOGONAL MODULATOR I-ch DC OFFSET | 0.001 [V] |
| ORTHOGONAL MODULATOR Q-ch DC OFFSET | 0.002 [V] |
| ORTHOGONAL DEMODULATOR AMPLITUDE ERROR | 0.1 [dB] |
| ORTHOGONAL DEMODULATOR PHASE ERROR | 0.2 [deg] |
| ORTHOGONAL DEMODULATOR I-ch DC OFFSET | 0.001 [V] |
| ORTHOGONAL DEMODULATOR Q-ch DC OFFSET | −0.001 [V] |
| ANALOG PORTION GAIN | 1.2 (ANTILOGARITHM) 1.5836 ... (dB) |
| | |
| ORTHOGONAL MODULATOR AMPLITUDE ERROR INITIAL RANGE | [−1, 1] [dB] |
| ORTHOGONAL MODULATOR PHASE ERROR INITIAL RANGE | [−3, 3] [deg] |
| ORTHOGONAL MODULATOR I-ch DC OFFSET INITIAL RANGE | [−0.01, 0.01] [V] |
| ORTHOGONAL MODULATOR Q-ch DC OFFSET INITIAL RANGE | [−0.01, 0.01] [V] |
| ORTHOGONAL DEMODULATOR AMPLITUDE ERROR INITIAL RANGE | [−1, 1] [dB] |
| ORTHOGONAL DEMODULATOR PHASE ERROR INITIAL RANGE | [−3, 3] [deg] |
| ORTHOGONAL DEMODULATOR I-ch DC OFFSET INITIAL RANGE | [−0.01, 0.01] [V] |
| ORTHOGONAL DEMODULATOR Q-ch DC OFFSET INITIAL RANGE | [−0.01, 0.01] [V] |
| ANALOG PORTION GAIN RANGE | [−3, 3] [dB] |

FIG. 30

| | NUMBER OF ESTIMATIONS | | | ESTIMATION VALUE | | | SET VALUE | 20TH ERROR |
|---|---|---|---|---|---|---|---|---|
| | | | | 5 | 10 | 20 | | |
| QMOD | AMPLITUDE ERROR | $\Delta g_m$ | [dB] | 0.256 | 0.250 | 0.250 | 0.250 | 4.0E-07 |
| | PHASE ERROR | $\Delta\theta_m$ | [deg] | 0.275 | 0.301 | 0.300 | 0.300 | 2.7E-06 |
| | I-ch DC | $I_{DCm}$ | [mV] | 0.554 | 0.996 | 1.000 | 1.000 | 5.2E-06 |
| | Q-ch DC | $Q_{DCm}$ | [mV] | 1.726 | 1.995 | 2.000 | 2.000 | 3.0E-06 |
| | GAIN | G | [dB] | 1.585 | 1.584 | 1.584 | 1.584 | 5.0E-08 |
| QDEMOD | AMPLITUDE ERROR | $\Delta g_d$ | [dB] | 0.095 | 0.100 | 0.100 | 0.100 | 3.0E-07 |
| | PHASE ERROR | $\Delta\theta_d$ | [deg] | 0.226 | 0.198 | 0.200 | 0.200 | 3.0E-06 |
| | I-ch DC | $I_{DCd}$ | [mV] | 1.205 | 0.996 | 1.000 | 1.000 | 1.1E-05 |
| | Q-ch DC | $Q_{DCd}$ | [mV] | -0.926 | -0.999 | -1.000 | -1.000 | -1.0E-07 |

| NUMBER OF DIVISIONS D | PHASE ANGLE φ | CONVERGENT CHARACTERISTIC (NUMBER OF LOOPS TO CONVERGENCE) |
|---|---|---|
| 1 | 0°, 90° | ∞ (ANSWER CANNOT BE OBTAINED) |
| 2 | 0°, 90° | 9 |
| 4 | DIVIDE 360° INTO 4 PARTS (0°, 90°, 180°, 270°) | 9 |
| 8 | DIVIDE 360° INTO 8 PARTS | 9 |
| 16 | DIVIDE 360° INTO 16 PARTS | 9 |
| 32 | DIVIDE 360° INTO 32 PARTS | 9 |
| 64 | DIVIDE 360° INTO 64 PARTS | 10 |

COMMUNICATING APPARATUS, METHOD OF CALCULATING SET VALUE OF ORTHOGONAL ERROR COMPENSATION AND ORTHOGONAL ERROR COMPENSATION PROGRAM

The entire disclosure of Japanese Patent Application No. 2006-191784 filed on Jul. 12, 2006 including specification, claims, drawings and abstract is incorporated herein by reference in its entirety.

BACKGROUND OF THE INVENTION

1. Field of the Invention

The present invention relates to a technique for estimating the errors of the orthogonal modulator and the orthogonal demodulator without switching a path for an RF signal.

2. Description of the Related Art

A structure of a DPD (Digital Pre-Distorter: Digital Nonlinear Distortion Compensator) using the orthogonal modulator/demodulator has been known widely and generally. For example, in FIG. 3 of JP-3198864-B2, a portion shown on a left of a D/A converter 308 and an A/D converter 322 corresponds to the structure.

Although the DPD can compensate a nonlinearity, however, an amplitude error, a phase error (orthogonal error) and a DC offset in the modulation and demodulation of I/Q signals in the orthogonal modulator and the orthogonal demodulator remain. Moreover, these errors which remain also influence a compensating performance of the nonlinearity of the DVD. For this reason, it is necessary to remove them separately.

On the other hand, a structure described in FIGS. 1 and 2 of JP-2000-270037-A has been known as a technique for compensating the error in the orthogonal modulator, for example. Moreover, a structure described in each of the drawings of JP-2003-309615A has been known as a technique for compensating the error in the orthogonal demodulator, for example.

All of the techniques have such a structure as to include a feedback system for demodulating outputs of orthogonal modulating/demodulating portions to detect an error.

Also in a structure in which the feedback system in the technique described in JP-3198864-B2, and the feedback system in the technique described in JP-2000-270037-A or the technique described in JP-2003-309615-A are simply shared, there is no means for deciding whether the error is made by the orthogonal modulator or the orthogonal demodulator or is made as a nonlinear error. For this reason, it is necessary to individually provide the feedback systems in the orthogonal modulator and the orthogonal demodulator. Therefore, a circuit scale is to be increased.

SUMMARY OF THE INVENTION

One embodiment of the invention relates to a communicating apparatus that includes a local signal generator, an orthogonal modulator, a first compensator, an orthogonal demodulator, a second compensator and an compensation controller.

The local signal generator generates a first local signal having a first phase and a second local signal having a second phase that is different from the first phase.

The orthogonal modulator modulates an input signal into a modulation signal by using the first local signal.

The first compensator corrects orthogonal modulation error generated in the orthogonal modulator.

The orthogonal demodulator demodulates the modulation signal into a demodulation signal by using the second local signal.

The second compensator corrects an orthogonal demodulation error generated in the orthogonal demodulator.

The compensation controller calculates a first set value to be set to the first compensator and a second set value to be set to the second compensator.

The first set value and the second set value are calculated based on (1) a phase difference between the first phase and the second phase, (2) the input signal and (3) the demodulation signal.

BRIEF DESCRIPTION OF THE DRAWINGS

Embodiment may be described in detail with reference to the accompanying drawings, in which:

FIGS. 7A to 7F are diagrams showing symbol points in the case in which the orthogonal modulator and the orthogonal demodulator are ideal;

FIGS. 8A to 8F are diagrams showing the symbol points in the case in which the orthogonal modulator has a DC Offset;

FIGS. 9A to 9F are diagrams showing the symbol points in the case in which the orthogonal demodulator has the DC offset;

FIGS. 10A to 10F are diagrams showing the symbol points in the case in which both the orthogonal modulator and the orthogonal demodulator have the DC offset;

FIGS. 11A to 11F are diagrams showing the symbol points in the case in which the orthogonal modulator has a gain error;

FIGS. 12A to 12F are diagrams showing the symbol points in the case in which the orthogonal demodulator has the gain error;

FIGS. 13A to 13F are diagrams showing the symbol points in the case in which the orthogonal modulator has a phase error;

FIGS. 14A to 14F are diagrams showing the symbol points in the case in which the orthogonal demodulator has the phase error;

FIG. 15 is a diagram showing a calculation model of the orthogonal modulator;

FIG. 16 is a diagram showing a calculation model of the orthogonal demodulator;

FIG. 19 is a diagram showing a calculation model which is equivalent in the case in which neither of the orthogonal modulator nor the orthogonal demodulator has a phase error and a DC offset and G=1 is set in the calculation model of FIG. 17;

FIG. 20 is a diagram showing a calculation model in the case in which a phase shift of the phase shifter 220 is set to be 0 degree and 90 degrees;

FIG. 24 is a table showing an example of a set value for a parameter estimation;

FIG. 30 is a table showing an example of a convergent value of each parameter;

DETAILED DESCRIPTION OF THE INVENTION

An embodiment will be described below in detail with reference to the drawings.

Figure 1:
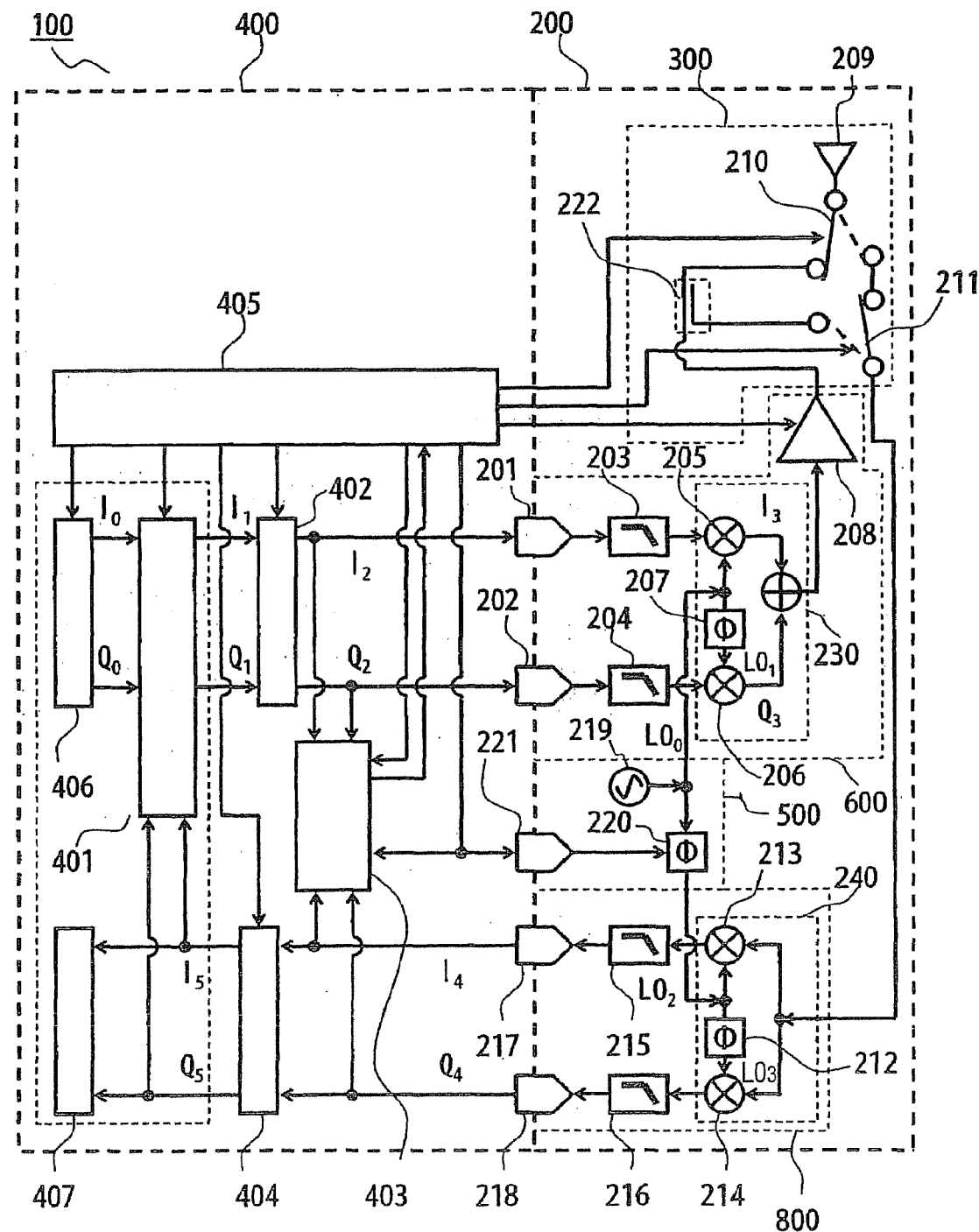
FIG. 1 is a block diagram showing a communicating apparatus.

FIG. 1 is a block diagram showing a communicating apparatus 100 according to the embodiment.

Description will be given to a structure of the communicating apparatus 100 which is divided into an analog portion 200 and a digital portion 400.

The analog portion 200 includes DACs (Digital-Analog Converters) 201 and 202, LPFs (Low Pass Filters) 203 and 204, mixers 205 and 206, a phase shifter 207, and a PA (Power Amplifier) 208. These will be hereinafter referred to as a transmitting system circuit 600 collectively.

The analog portion 200 includes mixers 213 and 214, a phase shifter 212, LPFs 215 and 216, and ADCs (Analog-Digital Converters) 217 and 218. These will be hereinafter referred to as a receiving system circuit 800 collectively.

The analog portion 200 includes an antenna 209, switches 210 and 211, and a coupler 222. These will be hereinafter referred to as an antenna sharing portion 300 collectively.

The analog portion 200 includes a phase shifter 220, a DAC 221, and an LO (Local signal oscillator) 219. These will be hereinafter referred to as an LO portion 500 collectively.

Digital orthogonal baseband signals $I_0$ and $Q_0$ are processed by the digital portion 400 and are supplied as $I_2$ and $Q_2$ to the DACs 201 and 202, respectively.

The DAC 201 converts $I_2$ into an analog signal and is supplied to the mixer 205 through the LPF 203. Moreover, the DAC 202 converts $Q_2$ into an analog signal and is supplied to the mixer 206 through the LPF 204.

The mixer 205 modulates $I_2$ converted into the analog signal by using a signal LO0 output from the LO 219. Moreover, the mixer 206 modulates $Q_2$ converted into the analog signal by using a signal LO1 having a phase shifted at 90 degrees by the phase shifter 207. In the embodiment, an orthogonal modulator 230 is constituted by the mixers 205 and 206 and the phase shifter 207.

The PA 208 amplifies an addition signal of $I_3$ to be an output of the mixer 205 and $Q_3$ to be an output of the mixer 206, and outputs an amplified modulation signal.

An amplifier, an attenuator or a filter may be inserted between an output of the orthogonal modulator 230 and the PA 208 if necessary, which is not shown. Moreover, these may be variable amplifiers or variable attenuators. In addition, a filter or an isolator may be inserted on an output side of the PA 208 if necessary. Furthermore, the PA 208 may take a structure of a so-called linearizer of a feedforward type or a pre-distortion type. Moreover, the PA 208 may have any operation class, and furthermore, may take a special structure such as a Doherty amplifier or an EER.

The switch 210 connects/disconnects the antenna 209 and the transmitting system circuit 600. Moreover, the switch 210 connects/disconnects the antenna 209 and the switch 211 connected to the receiving system circuit 800.

The switch 211 connects/disconnects a path diverging a part of an output of the PA 208 through the coupler 222 and the receiving system circuit 800. Moreover, the switch 211 also connects/disconnects the switch 210 and the receiving system circuit 800. The case in which the switch 210 connects the antenna 209 to the transmitting system circuit 600 will be hereinafter referred to as a transmitting mode, the case in which the switches 210 and 211 connect the antenna 209 and the receiving system circuit 800 will be hereinafter referred to as a receiving mode, and a state in which the switch 211 connects a signal branched from the PA 208 through the coupler 222 and the receiving system circuit 800 will be hereinafter referred to as an error estimating mode. The error estimating mode and the transmitting mode can be utilized at the same time, and the transmitting mode and the receiving mode are exclusive. Moreover, the receiving mode and the error estimating mode are also exclusive.

The antenna sharing portion 300 may have such a structure that there is no receiving mode (that is, neither the switch 210 nor the switch 211 is present). Moreover, an actual system may have such a structure that a filter is inserted to suppress the input/output of an unnecessary wave transmitted from the antenna 209 if necessary, which is not shown in FIG. 1. Moreover, it is also possible to employ a structure in which a filter is inserted to reduce a wraparound of the unnecessary wave to the receiving system circuit 800 in the error estimating mode.

The DAC 221 converts a phase control digital signal output from a control portion 405 which will be described below into an analog signal and supplies the analog signal to the phase shifter 220.

The phase shifter 220 carries out a phase shift corresponding to the analog signal supplied from the DAC 221 over an LO signal output from the LO 219. In other words, the LO 219 and the phase shifter 220 constitute a local signal generating portion for generating two local signals having phases shifted from each other. A signal output from the phase shifter 220 will be referred to as LO2.

The mixers 213 and 214 input a receiving signal received by the antenna 209 in the receiving mode and an amplified modulation signal to be an output of the PA 208 in the error estimating mode, respectively. The mixer 213 outputs a signal $I_4$ obtained by demodulating the receiving signal or the amplified modulation signal by using LO2 output from the phase shifter 220. Moreover, the mixer 214 outputs a signal $Q_4$ obtained by demodulating the receiving signal or the amplified modulation signal by using LO3 to be a signal output from the phase shifter 220 and further having a phase shifted at 90 degrees by the phase shifter 212. In the embodiment, the mixers 213 and 214 and the phase shifter 212 constitute an orthogonal demodulator 240.

The ADC 217 converts $I_4$ from which an unnecessary frequency component is removed through the LPF 215 into a digital signal and supplies the digital signal to the digital portion 400. Moreover, the ADC 218 converts $Q_4$ from which an unnecessary frequency component is removed through the LPF 216 into a digital signal and supplies the digital signal to the digital portion 400.

A filter, an amplifier or an attenuator may be inserted between the switch 211 and the orthogonal demodulator 240 if necessary, which is not shown. It is apparent that a variable filter, a variable amplifier or a variable attenuator may be provided.

The digital portion 400 includes a DPD (Digital Pre-Distorter: Nonlinear distortion compensating portion) 401, an orthogonal modulator error compensating portion 402 and an orthogonal demodulator error compensating portion 404, an orthogonal error estimating portion 403, a control portion 405, a transmitting signal generating portion 406 and a receiving signal processing portion 407.

The DPD 401 outputs $I_1$ and $Q_1$ obtained by carrying out a nonlinear distortion compensation over the orthogonal baseband signals $I_0$ and $Q_0$. A structure and an operation will be described below.

The orthogonal modulator error compensating portion 402 and the orthogonal demodulator error compensating portion 404 correct an orthogonal property (an amplitude error, a phase shift error and a DC offset) of an orthogonal digital signal of a baseband which is input. More specifically, the orthogonal modulator error compensating portion 402 and the orthogonal demodulator error compensating portion 404 output signals having I and Q components having an amplitude, a phase and a DC offset corrected in both components of the orthogonal digital signal of the baseband which is input. A relationship between the orthogonal modulator error compensating portion 402 and the orthogonal demodulator error compensating portion 404 is obtained and set from an orthogonal error detected in the error estimating mode.

The orthogonal error estimating portion 403 obtains various parameters to be set to the orthogonal modulator error compensating portion 402 in the error estimating mode corresponding to a calculation model of the orthogonal modulator error compensating portion 402. A more detailed structure will be described below.

The control portion 405 serves to carry out a sequence control which will be described below with reference to a flowchart and various calculations.

The transmitting signal generating portion 406 generates the orthogonal baseband signals $I_0$ and $Q_0$ from data to be transmitted. In the embodiment, the data to be transmitted are updated at a symbol rate corresponding to a transmitting system. Update rates of the respective orthogonal digital signals do not need to be coincident with each other between $I_0$ and $Q_0$, $I_1$ and $Q_1$, $I_2$ and $Q_2$, $I_4$ and $Q_4$, and $I_5$ and $Q_5$, and furthermore, the DACs 201 and 202, and the ADCs 217 and 218 but are usually set to have an advantageous relationship by a system of once, twice, four times, eight times and sixteen times. In the case in which the rate is converted, an interpolating filter and a processing such as decimation are required. However, the operation does not influence the advantage of the embodiment of the invention. In the embodiment, therefore, it is assumed that all of the update rates of the digital signals are coincident with each other. For convenience, moreover, the update rate is referred to as a symbol rate and is not an OFDM symbol rate in an OFDM but is equivalent to a sampling rate corresponding to an FFT point. Moreover, it is assumed that four types of symbol patterns are used in the error estimating mode. The receiving signal processing portion 407 serves to regenerate information from data input in the receiving mode.

Figure 2:
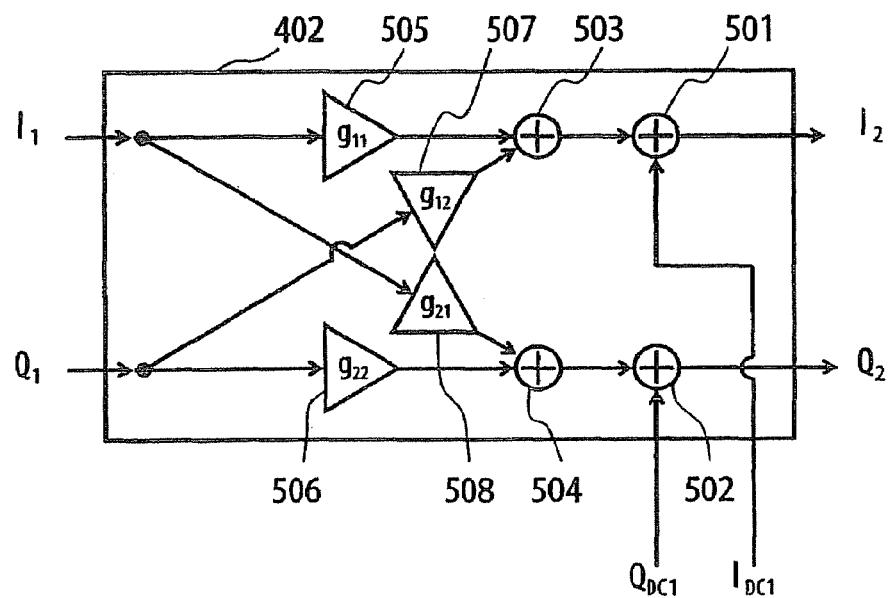
FIG. 2 is a block diagram showing an orthogonal modulator error compensating portion.

It is preferable that the orthogonal modulator error compensating portion 402 should have a structure described in FIG. 2 of the application, for example. More specifically, the orthogonal modulator error compensating portion 402 includes adders 501, 502, 503 and 504 and amplifiers 505, 506, 507 and 508.

The amplifier 505 amplifies the input $I_1$ at an amplification factor g11 controlled by the control portion 405 and outputs a signal. The amplifier 506 amplifies the input $Q_1$ at an amplification factor g22 controlled by the control portion 405 and outputs a signal. The amplifier 507 amplifies the input $Q_1$ at an amplification factor g12 controlled by the control portion 405 and outputs a signal. The amplifier 508 amplifies the input $I_1$ at an amplification factor g21 controlled by the control portion 405 and outputs a signal. The adder 503 adds the output of the amplifier 505 and that of the amplifier 507 and outputs a signal thus obtained. The adder 504 adds the output of the amplifier 506 and that of the amplifier 508 and outputs a signal. The adder 501 adds a signal output from the adder 503 and a DC offset controlling voltage IDC1 controlled by the control portion 405 and outputs $I_2$. The adder 502 adds a signal output from the amplifier 504 and a DC offset controlling voltage QDC1 controlled by the control portion 405 and outputs $Q_2$.

Figure 3:
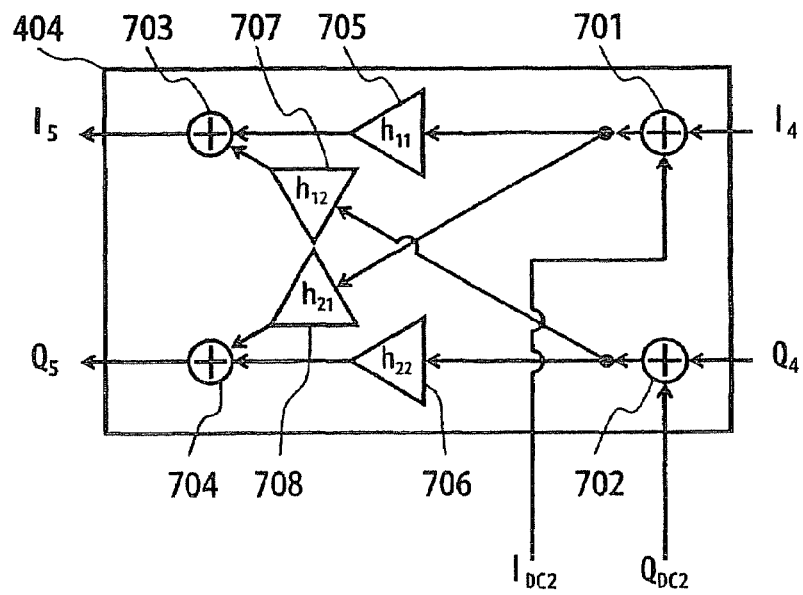
FIG. 3 is a block diagram showing an orthogonal demodulator error compensating portion.

It is preferable that the orthogonal demodulator error compensating portion 404 should have a structure shown in FIG. 3, for example. More specifically, the orthogonal demodulator error compensating portion 404 uses the same structure as that of the orthogonal modulator error compensating portion 402, and $I_4$ and $Q_4$ are input in place of $I_1$ and $Q_1$. Moreover, $I_5$ and $Q_5$ are output in place of $I_2$ and $Q_2$. Furthermore, DC offset controlling voltages IDC2 and QDC2 and amplification factors $h_{11}$, $h_{12}$, $h_{21}$ and $h_{22}$ of the respective amplifiers 705, 707, 708 and 706 are controlled by the control portion 405. Although the description has been given in such a configuration that positions in which the DC offset components are added are varied between the orthogonal modulator error compensating portion 402 and the orthogonal demodulator error compensating portion 404 in the example, this is employed for convenience of the calculation and order does not need to be always reversed.

Figure 4:
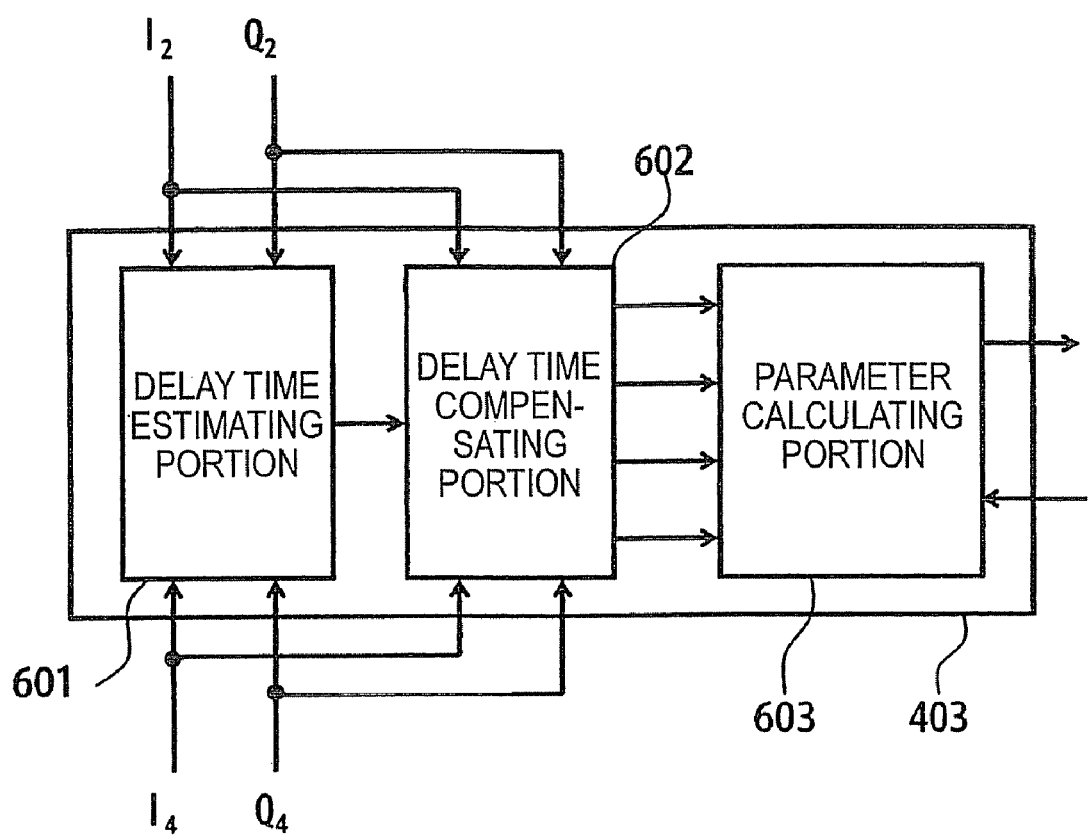
FIG. 4 is a block diagram showing an orthogonal error estimating portion.

It is preferable that the orthogonal error estimating portion 403 should have a structure described in FIG. 4, for example. More specifically, the orthogonal error estimating portion 403 includes a delay time estimating portion 601, a delay time compensating portion 602 and a parameter calculating portion 603.

As an estimating method, it is possible to propose a serial processing or continuous processing method (a streaming processing) following a sampling rate and a storage processing (a burst processing) or their intermediate processing method. In general, an error compensation of an orthogonal modulator and an orthogonal demodulator does not need to be processed following the sampling rate. Therefore, description will be given to the burst processing in the embodiment.

In case of the burst processing, $I_2$ and $Q_2$ output from the orthogonal modulator error compensating portion 402 are subjected to sampling corresponding to a predetermined number of samples. Similarly, $I_4$ and $Q_4$ input to the orthogonal demodulator error compensating portion 404 are subjected to the sampling corresponding to a predetermined number of samples.

Based on a correlation between data subjected to the sampling, the delay time estimating portion 601 estimates a delay time of the complex signals $I_4$ and $Q_4$ for the complex signals $I_2$ and $Q_2$.

The delay time compensating portion 602 obtains a delay time between both of the complex signals from the correlation between $I_2$ and $Q_2$ and $I_4$ and $Q_4$ which are subjected to the sampling. Moreover, the delay time compensating portion 602 delays $I_2$ and $Q_2$ sampled by the delay time estimating portion 601 by a delay time estimated by the delay time estimating portion 601 and supplies them to the parameter calculating portion 603. As a delay method, there have been known a method of a delay and insertion through a shift register capable of carrying out the streaming processing and a method of a phase shift rotation through an FFT which is executed by the burst processing.

The delay time estimating portion 601 and the delay time compensating portion 602 can also compensate the rotation of the IQ planes of the orthogonal modulator 230 and the orthogonal demodulator 240 at the same time. This processing serves to carry out a correction in such a manner that the IQ plane of the orthogonal modulator 230 is aligned with that of the orthogonal demodulator 240 when an amount of a phase shift of the phase shifter 220 is set to be zero, and is caused by the fact that an electric length of a signal line length from the LO 219 to the orthogonal modulator 230 is different from an electric length to the orthogonal demodulator 240 including the phase shifter 220. The processing can be optionally utilized for relieving a complicatedness of the calculation in the parameter calculating portion 603.

While a time is set to $I_4$ and $Q_4$ to be the receiving signals in the example, times of $I_4$ and $Q_4$ may be set forward to $I_2$ and $Q_2$ in the delay time compensating portion 602. Either of them is optionally set to be a reference.

The parameter calculating portion 603 inputs $I_4$ and $Q_4$ and $I_2$ and $Q_2$ which have times corrected, and calculates parameters to be set to the orthogonal modulator error compensating portion 402 and the orthogonal demodulator error compensating portion 404 from them. A method of calculating a parameter in the parameter calculating portion 603 will be described below.

Description will be given to a principle for estimating an error between the orthogonal modulator 230 and the orthogonal demodulator 240 by using the phase shifter 220 in the communicating apparatus 100 shown in FIG. 1.

The estimating principle will be described with reference to FIGS. 5A to 5D and FIGS. 6A to 6D. In the example, it is assumed that the errors of the orthogonal modulator and the orthogonal demodulator have values offset each other.

In FIG. 1, the orthogonal modulator 230 and the orthogonal demodulator 240 have a serial connecting relationship. Accordingly, there will be considered a model in which the orthogonal modulator and the orthogonal demodulator are directly coupled to each other.

Figure 5A:
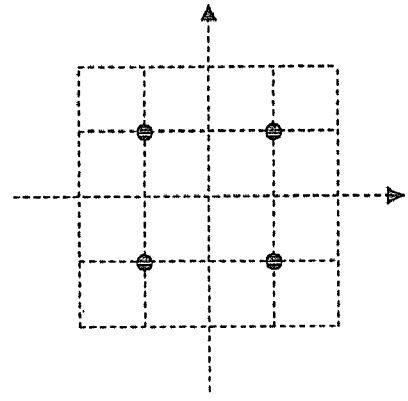
FIGS. 5A to 5D are diagrams showing coordinate points in the case in which phases of an orthogonal modulator and an orthogonal demodulator are not rotated.
Figure 5B:
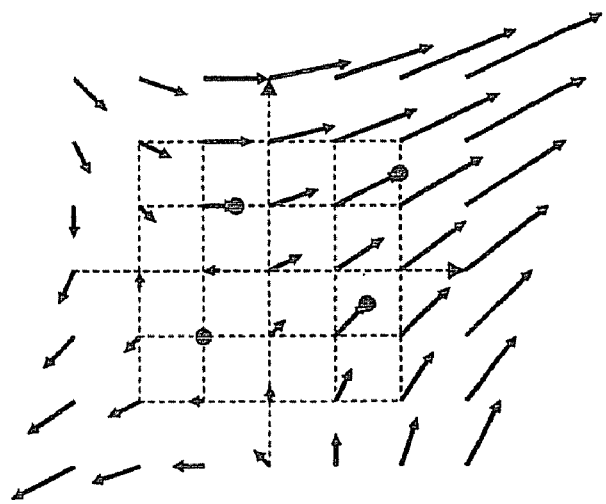
Figure 5C:
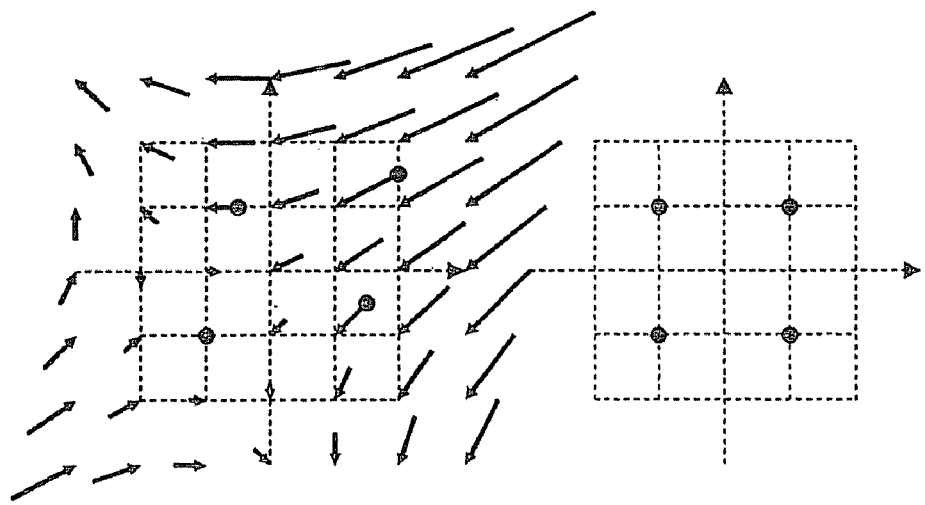
Figure 5D:
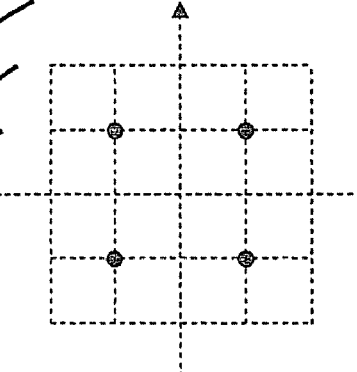
Figure 6A:
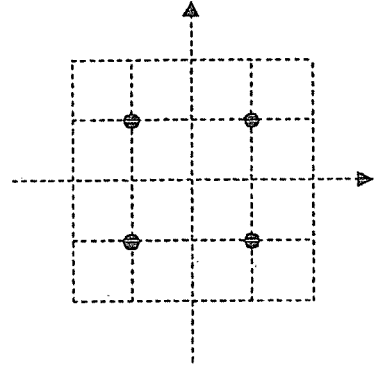
FIGS. 6A to 6D are diagrams showing coordinate points in the case in which the phases of the orthogonal modulator and the orthogonal demodulator are rotated at 90 degrees.
Figure 6B:
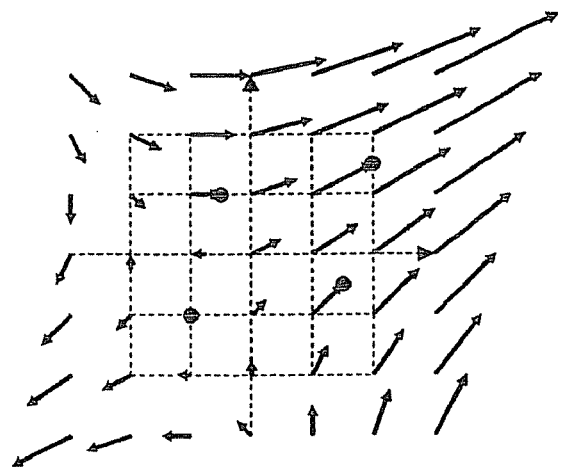
Figure 6C:
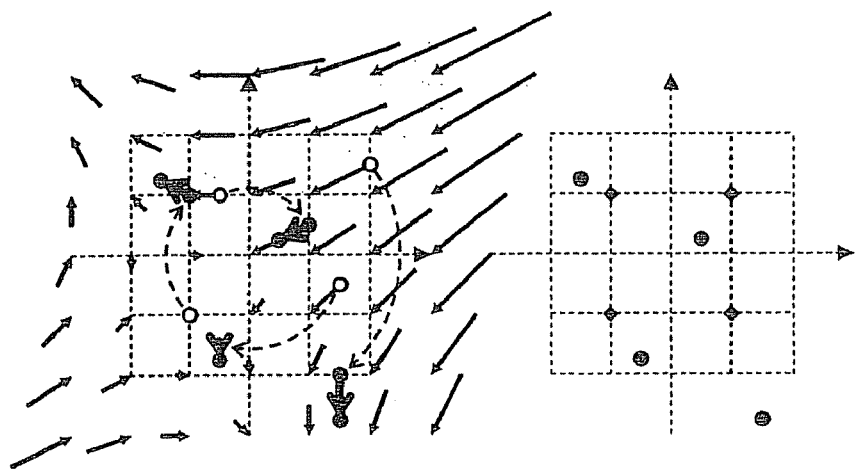
Figure 6D:
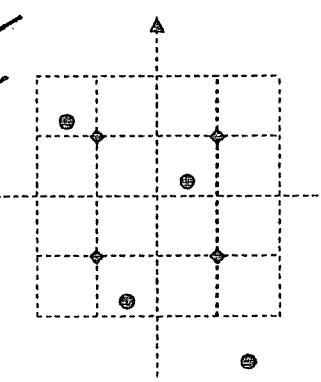

In FIG. 5A, four symbol points of QPSK are mapped on the IQ plane. In the orthogonal modulator having an error, grid points over the IQ plane are moved in directions shown in arrows of FIG. 5B. Accordingly, the four symbol points are also moved. A signal in this state is input to the orthogonal demodulator. Assuming that an error of the orthogonal demodulator is made as shown in the arrows over the IQ plane, the four symbol points are also moved to positions in which they are originally mapped (FIG. 5C). In the case in which mapping information (a baseband signal) input to the orthogonal modulator and mapping information (a baseband signal) about an output of the orthogonal demodulator are observed in the orthogonal modulator and the orthogonal demodulator which are directly coupled to each other, accordingly, there is a possibility that the presence of errors might be overlooked if both of the errors have an offset relationship.

On the other hand, FIGS. 6A to 6D show the case in which the IQ plane of the orthogonal demodulator is rotated by the phase shifter 220 by a method of providing a phase difference between an LO signal supplied to the orthogonal modulator and an LO signal supplied to the orthogonal demodulator. In FIGS. 6A to 6D, a rotation of 90 degrees is carried out. When the rotation at 90 degrees is carried out by the phase shifter, positions of the symbol points of the output of the orthogonal demodulator are moved to be apparently different from those in the case in which a phase rotation is not carried out. Therefore, it is possible to confirm the presence of the errors which are offset and overlooked in the case shown in FIGS. 5A to 5D. According to the embodiment, it is possible to distinguish whether the errors are made on the orthogonal modulator side or the orthogonal demodulator side and to separate them based on a phase rotating dependency of the mapping on these symbol points. Description will be given with reference to the drawing showing the state.

FIGS. 7A to 7F show a state in which four symbol points of (0.5, 0), (0, 0.5), (−0.5, 0) and (0, −0.5) are observed in the case in which an ideal orthogonal modulator and an ideal orthogonal demodulator are used.

FIG. 7F is a table shows a set value of an orthogonal error, and FIG. 7A is a diagram shows an example of a state of the output of the orthogonal modulator in the case in which mapping of 16 QAM is carried out, and is complementary for intuitively understanding a distortion of the IQ plane of the orthogonal modulator. FIG. 7B shows mapping in a digital portion input to the orthogonal modulator. FIG. 7C shows a state in which the output of the orthogonal modulator is input to the orthogonal demodulator and a rotation is given to the IQ plane by the phase shifter 220. FIG. 7D shows the output of the orthogonal demodulator. And, FIG. 7E shows a state in which the output of the orthogonal demodulator is reversely rotated over the IQ plane in the digital portion. Moreover, four phase rotating positions of 0 degree, 30 degrees, 60 degrees and 90 degrees are drawn for the phase rotation in each of the diagrams.

A value mapped in the digital portion is indicated in the input of the orthogonal modulator in FIG. 7B. The mapping seen from the orthogonal demodulator in which the IQ plane is rotated is obtained as shown in FIG. 7C if the orthogonal demodulator has no distortion. When the error of the orthogonal demodulator is received, next, a state is brought as shown in FIG. 7D. If the mapping output from the orthogonal demodulator is reversely rotated corresponding to the phase shift of the IQ plane in the digital portion, the state shown in FIG. 7E is brought. More specifically, when the IQ plane of the orthogonal demodulator is rotated by $\phi$, the state of FIG. 7E is observed by a return of $\phi$ in the digital portion.

In the example, both the orthogonal modulator and the orthogonal demodulator have no error. Therefore, the four symbol points are rotated every 30 degrees around an origin in a state of a square.

FIGS. 8A to 8F show the case in which the orthogonal modulator has a DC Offset. For the mapping in the digital portion, the output of the orthogonal modulator in FIG. 8A is mapped into a place in which the origin is shifted to (0.1, 0.2). In this state, a rotation is applied to the IQ plane. When the origin of the symbol point is rotated by 90 degrees, therefore, a movement to (−0.2, 0.1) is carried out. In this example, the input of the orthogonal modulator in FIG. 8B has no error and the IQ plane of the orthogonal demodulator in FIG. 8E has no distortion. Therefore, the output of the orthogonal demodulator in FIG. 8D is the same as the output of the orthogonal modulator in FIG. 8C. When the rotation in a reverse direction is carried out in the digital portion, furthermore, a return to a place in which all of the symbol points overlap is carried out, which is coincident with the output of the orthogonal modulator in FIG. 8A. If the orthogonal demodulator has no error, the output of the orthogonal demodulator in FIG. 8E is coincident with the output of the orthogonal modulator in FIG. 8A.

FIGS. 9A to 9F show the case in which the orthogonal demodulator has the DC offset. Herein, the DC offset of the orthogonal demodulator is intentionally set to be an offset value of the DC offset of the orthogonal modulator showed in FIGS. 8A to 8F. In this case, the orthogonal modulator has no error. For the output of the orthogonal modulator in FIG. 9C, therefore, a square is rotated every 30 degrees around an origin. This respect is different from FIGS. 8A to 8F. In FIGS. 8A to 8F, the orthogonal demodulator has no error. Therefore, the output of the orthogonal modulator in FIG. 9C is the same as that of the orthogonal demodulator in FIG. 9D. However, the orthogonal demodulator has an error in FIGS. 9A to 9F. Therefore, the output of the orthogonal modulator in FIG. 9C is different from the output of the orthogonal demodulator in FIG. 9D. The difference is the error itself of the orthogonal demodulator. In FIGS. 9A to 9F, the center of the rotation of the output of the orthogonal modulator in FIG. 9C is moved to (−0.1, −0.2) which is a set value itself of the DC offset. If the error is made on the orthogonal demodulator side, moreover, a graphic of the mapping is distorted like the output of the orthogonal demodulator in FIG. 9E corresponding to the amount of the phase shift. In this case, a relative positional relationship between the four symbol points is maintained to be a square. However, the origin is changed corresponding to the amount of the phase shift. A variation is equivalent to the DC offset.

FIGS. 10A to 10F show the case in which both the orthogonal modulator and the orthogonal demodulator have the DC offset. As described above, a difference between the input of the orthogonal modulator in FIG. 10B and output of the orthogonal modulator in FIG. 10C is caused by the error of the orthogonal modulator, and a difference between the output of the orthogonal modulator in FIG. 10C and that of the orthogonal demodulator in FIG. 10D is caused by the error of the orthogonal demodulator. In the drawing, all of the symbol points in the output of the orthogonal modulator in FIG. 10C and that of the orthogonal demodulator in FIG. 10D are moved in parallel by (−0.1, −0.2). Therefore, it is apparent that the DC offset of the orthogonal demodulator is (−0.1, −0.2). Referring to the input of the orthogonal modulator in FIG. 10B and output of the orthogonal modulator in FIG. 10C, moreover, the origin is moved by the rotation. While the movement may be observed, a decision may be made based on the output of the orthogonal demodulator in FIG. 10D and that of the orthogonal demodulator in FIG. 10E. The phase shift amount dependency appearing on the output of the orthogonal demodulator in FIG. 10E is the error itself of the orthogonal demodulator, and a component which does not depend on the amount of the phase shift is the error of the orthogonal modulator.

FIGS. 11A to 11F show the case in which the orthogonal modulator has a gain error. By the gain error, the mapping of the output of the orthogonal modulator in FIG. 11A is extended to be a rectangle. The state is brought in the output of the orthogonal demodulator in FIG. 11E.

Similarly, FIGS. 12A to 12F show the case in which the orthogonal demodulator has the gain error. Referring to the output of the orthogonal demodulator in FIG. 12F, the relative positional relationship between the symbol points is observed to be changed and distorted depending on the amount of the rotation of the IQ plane.

FIGS. 13A to 13F show the case in which the orthogonal modulator has a phase error. By the phase error, the mapping of the output of the orthogonal modulator in FIG. 13A is deformed to be a rhombus. The state is brought in the output of the orthogonal demodulator in FIG. 13E.

Similarly, FIGS. 14A to 14F show the case in which the orthogonal demodulator has the phase error. Referring to the output of the orthogonal demodulator in FIG. 14E, the relative positional relationship between the symbol points is observed to be changed and distorted depending on the amount of the rotation of the IQ plane.

By rotating the IQ plane of the orthogonal demodulator with respect to the IQ plane of the orthogonal modulator by an optional phase (that is, carrying out a phase shift) as described above, it is possible to observe the motion of the symbol points depending on the amount of the phase shift. Description will be given to a method of mathematically analyzing the motion and carrying out a separation into the error of the orthogonal modulator and that of the orthogonal demodulator.

FIG. 15 shows a calculation model of the orthogonal modulator 230. The calculation model of the orthogonal modulator 230 includes a gain generated in a path reaching the orthogonal modulator 240 from the output of the orthogonal modulator 230. This is expressed in the following equation (1).

$$\begin{bmatrix} M_I(n) \\ M_Q(n) \end{bmatrix} = G\Psi_m \cdot \begin{bmatrix} S_I(n) + I_{DCm} \\ S_Q(n) + Q_{DCm} \end{bmatrix} \quad (1)$$

FIG. 16 shows a calculation model of the orthogonal demodulator 240. FIGS. 15 and 16 show an example of the calculation models of the orthogonal modulator 230 and the orthogonal demodulator 240. In general, the calculation model is modeled to be symmetrical with the compensators 402 and 404 and is selected in such a manner that a compensation parameter can be determined by an inverse matrix.

For example, it is preferable that a conversion should not be carried out in a cascade connection of the compensator and the modulator in order to compensate the error of the orthogonal modulator in FIG. 15.

$$\begin{bmatrix} 1 & 0 \\ 0 & 1 \end{bmatrix} = G\Psi_m \cdot \left\{ \left( \frac{1}{G} \Psi_m^{-1} + \begin{bmatrix} -I_{DCm} \\ -Q_{DCm} \end{bmatrix} \right) + \begin{bmatrix} I_{DCm} \\ Q_{DCm} \end{bmatrix} \right\} \quad (2)$$

For the compensator, a structure capable of carrying out the calculation is often used. For the demodulator, similarly, the same structure is used. The compensator shown in FIGS. 2 and 3 is a typical example based on the thought.

Next, description will be given to a basic principle of an estimation.

Figure 17:
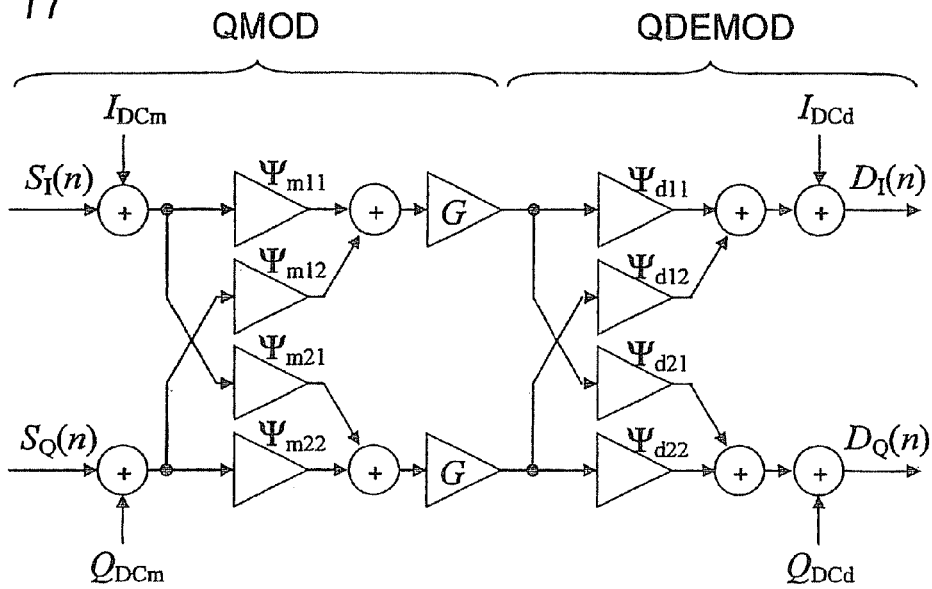
FIG. 17 is a diagram showing a calculation model in the case in which an output of the orthogonal modulator is not rotated but input to the orthogonal demodulator.

A normal structure having no phase shifter 220 in which the amount of a phase shift is changed during a transmission or an error estimation in order to carry out an orthogonal error estimation can be expressed in a model in which the output of the orthogonal modulator is directly input to the orthogonal demodulator as shown in FIG. 17. In FIG. 17, it is assumed that phase planes of the orthogonal modulator and the orthogonal demodulator are coincident with each other. Therefore, an Ich output of an orthogonal modulator (QMOD) is input to Ich of an orthogonal demodulator (QDEMOD), and a Qch output of the orthogonal modulator (QMOD) is input to Qch of the orthogonal demodulator (QDEMOD). This can be expressed in the following equation (3).

$$\begin{bmatrix} D_I(n) \\ D_Q(n) \end{bmatrix} = \Psi_d \cdot G \cdot \Psi_m \begin{bmatrix} S_I(n) + I_{DCm} \\ S_Q(n) + Q_{DCm} \end{bmatrix} + \begin{bmatrix} I_{DCd} \\ Q_{DCd} \end{bmatrix} \quad (3)$$

Figure 18:
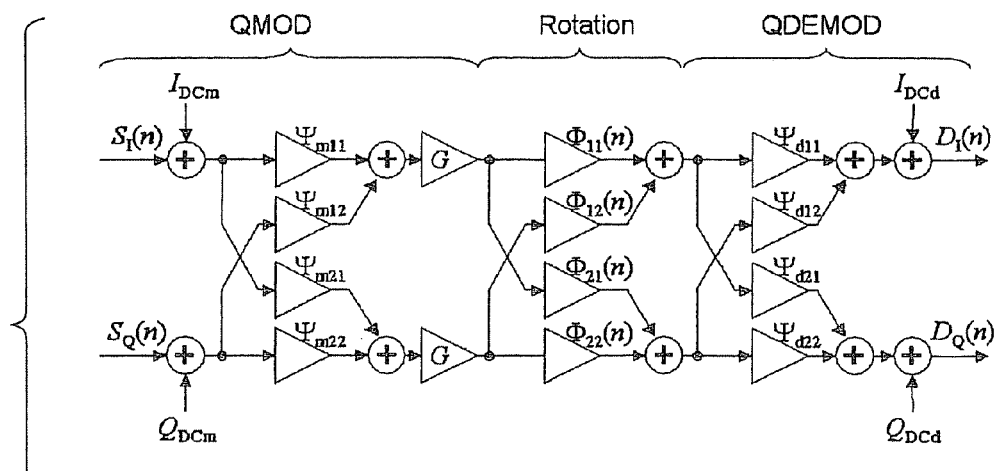
FIG. 18 is a diagram showing a calculation model in the case in which an IQ plane is rotated by a phase shifter.

On the other hand, a calculation model in the case in which the rotation of the IQ plane is carried out by the phase shifter 220 can be expressed in FIG. 18. The orthogonal modulator and the orthogonal demodulator are connected through a rotating matrix Φ and are expressed in the following equation (4).

$$\begin{bmatrix} D_I(n) \\ D_Q(n) \end{bmatrix} = \Psi_d \cdot \Phi \cdot G \cdot \Psi_m \begin{bmatrix} S_I(n) + I_{DCm} \\ S_Q(n) + Q_{DCm} \end{bmatrix} + \begin{bmatrix} I_{DCd} \\ Q_{DCd} \end{bmatrix} \quad (4)$$

In general, a commutative law is not set up in a matrix. Accordingly, order of the calculation is stored. Therefore, it is possible to separate the errors of the orthogonal modulator and the orthogonal demodulator.

First, description will be given to a principle for separating the gain error of the orthogonal modulator from that of the orthogonal demodulator.

If the orthogonal modulator and the orthogonal demodulator have neither the phase error nor the DC offset and G=1 is set in the model of FIG. 17, FIG. 17 can be drawn like FIG. 19. This can be expressed in the following equation (5).

$$\begin{bmatrix} D_I(n) \\ D_Q(n) \end{bmatrix} = \begin{bmatrix} \Delta g_d & 0 \\ 0 & \frac{1}{\Delta g_d} \end{bmatrix} \cdot 1 \cdot \begin{bmatrix} \Delta g_m & 0 \\ 0 & \frac{1}{\Delta g_m} \end{bmatrix} \begin{bmatrix} S_I(n) \\ S_Q(n) \end{bmatrix} \quad (5)$$

Consequently, the following two equations (6) can be obtained.

$$\begin{cases} D_I(n) = \Delta g_d \Delta g_m S_I(n) \\ D_Q(n) = \frac{1}{\Delta g_d} \frac{1}{\Delta g_m} S_Q(n) \end{cases} \quad (6)$$

As is apparent from the equations (6), however, the gain errors of the orthogonal modulator and the orthogonal demodulator take the form of a product. Even if the equations (6) are solved, the separation cannot be carried out. In order to separate Δgd from Δgm, a ratio of Δgd to Δgm is required. Therefore, it is considered that the phase planes of the orthogonal modulator and the orthogonal demodulator are rotated by the phase shifter 220.

FIG. 20 shows the case in which the phase of the phase shifter 220 is set to be 0 degree and 90 degrees. It is assumed that there is no phase error in the same manner as in FIG. 19. For a value evaluated in a state of 0 degree for an n-th sample and a value evaluated in a state of 90 degrees after a p-th sample, a path for a calculation is varied. This can be expressed in the following equations (7).

$$\begin{cases} D_I(n) = \Delta g_d \Delta g_m S_I(n) \\ D_Q(n) = \frac{1}{\Delta g_d} \frac{1}{\Delta g_m} S_Q(n) \\ D_I(n+p) = \Delta g_d \frac{1}{\Delta g_m} S_Q(n+p) \\ D_Q(n+p) = \frac{1}{\Delta g_d} \Delta g_m S_I(n+p) \end{cases} \quad (7)$$

Thus, the four equations (7) can be obtained. In this case, the path is replaced on the orthogonal demodulator side, and furthermore, a sign is inverted. Therefore, it is necessary to cause parameters to be consistent with each other on the orthogonal modulator side and the orthogonal demodulator side. In the example, both the product and the ratio of the gain errors of the orthogonal modulator and the orthogonal demodulator are definite. Therefore, the separation can be carried out.

If neither the phase error nor the amplitude error is present, G=1 is set and the phase rotation is not applied, the following equation (8) can be obtained from FIG. 19.

$$\begin{bmatrix} D_I(n) \\ D_Q(n) \end{bmatrix} = \begin{bmatrix} 1 & 0 \\ 0 & 1 \end{bmatrix} \cdot 1 \cdot \begin{bmatrix} 1 & 0 \\ 0 & 1 \end{bmatrix} \begin{bmatrix} S_I(n) \\ S_Q(n) \end{bmatrix} + \begin{bmatrix} I_{DCm} \\ Q_{DCm} \end{bmatrix} + \begin{bmatrix} I_{DCd} \\ Q_{DCd} \end{bmatrix} \quad (8)$$

Consequently, the following two equations (9) can be obtained.

$$\begin{cases} D_I(n) = S_I(n) + I_{DCm} + I_{DCd} \\ D_Q(n) = S_Q(n) + I_{DCQ} + I_{DCQ} \end{cases} \quad (9)$$

As a matter of course, it is impossible to separate the DC offsets on the orthogonal modulator side and the orthogonal demodulator side by only a result of an addition of the DC offset values of both the orthogonal modulator and the orthogonal demodulator. On other hand, if the phase rotation is applied by the phase shifter, the following equations (10) can be obtained.

$$\begin{cases} D_I(n) = S_I(n) + I_{DCm} + I_{DCd} \\ D_Q(n) = S_Q(n) + I_{DCQ} + I_{DCQ} \\ D_I(n+p) = -S_Q(n+p) - Q_{DCm} + I_{DCd} \\ D_Q(n+p) = S_I(n+p) + I_{DCm} + Q_{DCd} \end{cases} \quad (10)$$

It is possible to obtain four DC offset components from the four equations (10). In this way, it is also possible to separate the DC offsets by applying the phase rotation.

If neither the DC offset nor the gain error is present and G=1 is set, modeling is carried out in the following equation (11).

$$\begin{bmatrix} D_I(n) \\ D_Q(n) \end{bmatrix} = \begin{bmatrix} \cos\Delta\theta_d & \sin\Delta\theta_d \\ \sin\Delta\theta_d & \cos\Delta\theta_d \end{bmatrix} \begin{bmatrix} \cos\phi(n) & -\sin\phi(n) \\ \sin\phi(n) & \cos\phi(n) \end{bmatrix} \quad (11)$$

$$\begin{bmatrix} \cos\Delta\theta_m & \sin\Delta\theta_m \\ \sin\Delta\theta_m & \cos\Delta\theta_m \end{bmatrix} \begin{bmatrix} S_I(n) \\ S_Q(n) \end{bmatrix}$$

If the phase rotation is not applied by the phase shifter, the following equation (12) is obtained because of $\phi=0$.

$$\begin{bmatrix} D_I(n) \\ D_Q(n) \end{bmatrix} = \begin{bmatrix} \cos\Delta\theta_d & \sin\Delta\theta_d \\ \sin\Delta\theta_d & \cos\Delta\theta_d \end{bmatrix} \begin{bmatrix} 1 & 0 \\ 0 & 1 \end{bmatrix} \begin{bmatrix} \cos\Delta\theta_m & \sin\Delta\theta_m \\ \sin\Delta\theta_m & \cos\Delta\theta_m \end{bmatrix} \begin{bmatrix} S_I(n) \\ S_Q(n) \end{bmatrix} \quad (12)$$

Accordingly, a unit matrix disappears so that the following equation (13) can be obtained.

$$\begin{bmatrix} D_I(n) \\ D_Q(n) \end{bmatrix} = \begin{bmatrix} \cos\Delta\theta_d & \sin\Delta\theta_d \\ \sin\Delta\theta_d & \cos\Delta\theta_d \end{bmatrix} \begin{bmatrix} \cos\Delta\theta_m & \sin\Delta\theta_m \\ \sin\Delta\theta_m & \cos\Delta\theta_m \end{bmatrix} \begin{bmatrix} S_I(n) \\ S_Q(n) \end{bmatrix} \quad (13)$$

An associative law is applied to first calculate the contents of the matrix so that the following equation (14) can be obtained.

$$\begin{bmatrix} \cos\Delta\theta_d & \sin\Delta\theta_d \\ \sin\Delta\theta_d & \cos\Delta\theta_d \end{bmatrix} \begin{bmatrix} \cos\Delta\theta_m & \sin\Delta\theta_m \\ \sin\Delta\theta_m & \cos\Delta\theta_m \end{bmatrix} = \quad (14)$$

$$\begin{bmatrix} \cos\Delta\theta_d\cos\Delta\theta_m + \sin\Delta\theta_d\sin\Delta\theta_m & \cos\Delta\theta_d\sin\Delta\theta_m + \sin\Delta\theta_d\cos\Delta\theta_m \\ \sin\Delta\theta_d\cos\Delta\theta_m + \cos\Delta\theta_d\sin\Delta\theta_m & \sin\Delta\theta_c\sin\Delta\theta_m + \cos\Delta\theta_d\cos\Delta\theta_m \end{bmatrix}$$

If a product of a trigonometric function of each element is rewritten in the form of a sum, the following equations (15) can be obtained.

$$\cos\Delta\theta_d\cos\Delta\theta_m = \frac{1}{2}\{\cos(\Delta\theta_d + \Delta\theta_m) + \cos(\Delta\theta_d - \Delta\theta_m)\} \quad (15)$$

$$\sin\Delta\theta_d\sin\Delta\theta_m = \frac{1}{2}\{-\cos(\Delta\theta_d + \Delta\theta_m) + \cos(\Delta\theta_d - \Delta\theta_m)\}$$

$$\cos\Delta\theta_d\sin\Delta\theta_m = \frac{1}{2}\{\sin(\Delta\theta_d + \Delta\theta_m) - \sin(\Delta\theta_d - \Delta\theta_m)\}$$

$$\sin\Delta\theta_d\cos\Delta\theta_m = \frac{1}{2}\{\sin(\Delta\theta_d + \Delta\theta_m) + \sin(\Delta\theta_d - \Delta\theta_m)\}$$

Each element is (1, 1)=(2, 2) and (1, 2)=(2, 1). If they are arranged respectively, therefore, the following equations (16) can be obtained.

$$\begin{aligned} \cos\Delta\theta_d\cos\Delta\theta_m + \\ \sin\Delta\theta_d\sin\Delta\theta_m \end{aligned} = \frac{1}{2}\{\cos(\Delta\theta_d + \Delta\theta_m) + \cos(\Delta\theta_d - \Delta\theta_m)\} + \quad (16)$$

$$\frac{1}{2}\{-\cos(\Delta\theta_d + \Delta\theta_m) + \cos(\Delta\theta_d - \Delta\theta_m)\}$$

$$= \frac{1}{2}\cos(\Delta\theta_d + \Delta\theta_m) + \frac{1}{2}\cos(\Delta\theta_d - \Delta\theta_m) -$$

$$\frac{1}{2}\cos(\Delta\theta_d + \Delta\theta_m) + \frac{1}{2}\cos(\Delta\theta_d - \Delta\theta_m)$$

$$= \cos(\Delta\theta_d - \Delta\theta_m)$$

$$\begin{aligned} \cos\Delta\theta_d\sin\Delta\theta_m + \\ \sin\Delta\theta_d\cos\Delta\theta_m \end{aligned} = \frac{1}{2}\{\sin(\Delta\theta_d + \Delta\theta_m) - \sin(\Delta\theta_d - \Delta\theta_m)\} +$$

$$\frac{1}{2}\{\sin(\Delta\theta_d + \Delta\theta_m) + \sin(\Delta\theta_d - \Delta\theta_m)\}$$

$$= \frac{1}{2}\sin(\Delta\theta_d + \Delta\theta_m) - \frac{1}{2}\sin(\Delta\theta_d - \Delta\theta_m) +$$

$$\frac{1}{2}\sin(\Delta\theta_d + \Delta\theta_m) + \frac{1}{2}\sin(\Delta\theta_d - \Delta\theta_m)$$

$$= \sin(\Delta\theta_d + \Delta\theta_m)$$

Accordingly, a product of a matrix to be obtained is as following equation (17).

$$\begin{bmatrix} \cos\Delta\theta_d & \sin\Delta\theta_d \\ \sin\Delta\theta_d & \cos\Delta\theta_d \end{bmatrix} \quad (17)$$

$$\begin{bmatrix} \cos\Delta\theta_m & \sin\Delta\theta_m \\ \sin\Delta\theta_m & \cos\Delta\theta_m \end{bmatrix} = \begin{bmatrix} \cos(\Delta\theta_d - \Delta\theta_m) & \sin(\Delta\theta_d + \Delta\theta_m) \\ \sin(\Delta\theta_d + \Delta\theta_m) & \cos(\Delta\theta_d - \Delta\theta_m) \end{bmatrix}$$

Finally, the following equation (18) can be obtained as a calculation model.

$$\begin{bmatrix} D_I(n) \\ D_Q(n) \end{bmatrix} = \begin{bmatrix} \cos(\Delta\theta_d - \Delta\theta_m) & \sin(\Delta\theta_d + \Delta\theta_m) \\ \sin(\Delta\theta_d + \Delta\theta_m) & \cos(\Delta\theta_d - \Delta\theta_m) \end{bmatrix} \begin{bmatrix} S_I(n) \\ S_Q(n) \end{bmatrix} \quad (18)$$

This can be expressed in the following equations (19).

$$\begin{cases} D_I(n) = \cos(\Delta\theta_d - \Delta\theta_m)S_I(n) + \sin(\Delta\theta_d + \Delta\theta_m)S_Q(n) \\ D_Q(n) = \cos(\Delta\theta_d + \Delta\theta_m)S_I(n) + \cos(\Delta\theta_d - \Delta\theta_m)S_Q(n) \end{cases} \quad (19)$$

In the equations (19), the phase error of the orthogonal modulator and that of the orthogonal demodulator appear in the form of a sum and a difference. From their relationship, accordingly, there is a wrong idea that both of the errors can be separated from each other based on their relationship. However, it is apparent that the sum of the phase errors forms a sine function and the difference thereof forms a cosine function. The sin function and the cosine function have two values for an angle indicative of an optional value within a range of $\pm\pi$. Therefore, it is impossible to specify the values of the sum of the phase errors and the difference therebetween. If the cosine function and the sin function accidentally take a value of $\pm 1$, therefore, the phase errors of the orthogonal modulator and the orthogonal demodulator can be separated from each other based on the equations (19).

Therefore, there will also be considered the case in which the amount of a phase rotation obtained by the phase shifter is $\phi=\pi/2$. The model can be expressed in the following equation (20).

$$\begin{bmatrix} D_I(n+p) \\ D_Q(n+p) \end{bmatrix} = \begin{bmatrix} \cos\Delta\theta_d & \sin\Delta\theta_d \\ \sin\Delta\theta_d & \cos\Delta\theta_d \end{bmatrix} \begin{bmatrix} 0 & -1 \\ 1 & 0 \end{bmatrix} \begin{bmatrix} \cos\Delta\theta_m & \sin\Delta\theta_m \\ \sin\Delta\theta_m & \cos\Delta\theta_m \end{bmatrix} \quad (20)$$

$$\begin{bmatrix} S_I(n+p) \\ S_Q(n+p) \end{bmatrix}$$

By applying the associative law to first carry out a calculation for a rotating matrix in a second part on a right member and an error matrix of the orthogonal modulator in a third part on the right member, the following equation (21) can be obtained.

$$\begin{bmatrix} 0 & -1 \\ 1 & 0 \end{bmatrix} \begin{bmatrix} \cos\Delta\theta_m & \sin\Delta\theta_m \\ \sin\Delta\theta_m & \cos\Delta\theta_m \end{bmatrix} = \begin{bmatrix} 0\cdot\cos\Delta\theta_m - 1\cdot\sin\Delta\theta_m & 0\cdot\sin\Delta\theta_m - 1\cdot\cos\Delta\theta_m \\ 1\cdot\cos\Delta\theta_m + 0\cdot\sin\Delta\theta_m & 1\cdot\sin\Delta\theta_m + 0\cdot\cos\Delta\theta_m \end{bmatrix} \quad (21)$$

$$= \begin{bmatrix} -\sin\Delta\theta_m & -\cos\Delta\theta_m \\ \cos\Delta\theta_m & \sin\Delta\theta_m \end{bmatrix}$$

This is returned to obtain the following equation (22).

$$\begin{bmatrix} D_I(n+p) \\ D_Q(n+p) \end{bmatrix} = \begin{bmatrix} \cos\Delta\theta_d & \sin\Delta\theta_d \\ \sin\Delta\theta_d & \cos\Delta\theta_d \end{bmatrix} \begin{bmatrix} -\sin\Delta\theta_m & -\cos\Delta\theta_m \\ \cos\Delta\theta_m & \sin\Delta\theta_m \end{bmatrix} \quad (22)$$

$$\begin{bmatrix} S_I(n+p) \\ S_Q(n+p) \end{bmatrix}$$

In the same manner as in the former case, the calculation for the matrix is first carried out as expressed in the following equation (23).

$$\begin{bmatrix} \cos\Delta\theta_d & \sin\Delta\theta_d \\ \sin\Delta\theta_d & \cos\Delta\theta_d \end{bmatrix} \begin{bmatrix} -\sin\Delta\theta_m & -\cos\Delta\theta_m \\ \cos\Delta\theta_m & \sin\Delta\theta_m \end{bmatrix} = \quad (23)$$

$$\begin{bmatrix} -\cos\Delta\theta_d\sin\Delta\theta_m + \sin\Delta\theta_d\cos\Delta\theta_m & -\cos\Delta\theta_d\cos\Delta\theta_m + \sin\Delta\theta_d\sin\Delta\theta_m \\ -\sin\Delta\theta_d\sin\Delta\theta_m + \cos\Delta\theta_d\cos\Delta\theta_m & -\sin\Delta\theta_d\cos\Delta\theta_m + \cos\Delta\theta_d\sin\Delta\theta_m \end{bmatrix}$$

Each element is $(1, 1)=-(2, 2)$ and $(1, 2)=-(2, 1)$. Therefore, they are arranged respectively so that the following equations (24) can be obtained.

$$\begin{aligned} \cos\Delta\theta_d\cos\Delta\theta_m - \\ \sin\Delta\theta_d\sin\Delta\theta_m \end{aligned} = \frac{1}{2}\{\cos(\Delta\theta_d + \Delta\theta_m) + \cos(\Delta\theta_d - \Delta\theta_m)\} - \quad (24)$$

$$\frac{1}{2}\{-\cos(\Delta\theta_d + \Delta\theta_m) + \cos(\Delta\theta_d - \Delta\theta_m)\}$$

$$= \frac{1}{2}\cos(\Delta\theta_d + \Delta\theta_m) + \frac{1}{2}\cos(\Delta\theta_d - \Delta\theta_m) +$$

$$\frac{1}{2}\cos(\Delta\theta_d + \Delta\theta_m) - \frac{1}{2}\cos(\Delta\theta_d - \Delta\theta_m)$$

$$= \cos(\Delta\theta_d + \Delta\theta_m)$$

-continued $$\begin{aligned} \cos\Delta\theta_d\sin\Delta\theta_m - \\ \sin\Delta\theta_d\cos\Delta\theta_m \end{aligned} = \frac{1}{2}\{\sin(\Delta\theta_d + \Delta\theta_m) - \sin(\Delta\theta_d - \Delta\theta_m)\} -$$

$$\frac{1}{2}\{\sin(\Delta\theta_d + \Delta\theta_m) + \sin(\Delta\theta_d - \Delta\theta_m)\}$$

$$= \frac{1}{2}\sin(\Delta\theta_d + \Delta\theta_m) - \frac{1}{2}\sin(\Delta\theta_d - \Delta\theta_m) -$$

$$\frac{1}{2}\sin(\Delta\theta_d + \Delta\theta_m) - \frac{1}{2}\sin(\Delta\theta_d - \Delta\theta_m)$$

$$= -\sin(\Delta\theta_d - \Delta\theta_m)$$

Accordingly, a product of a matrix to be calculated is expressed in the following equation (25).

$$\begin{bmatrix} \cos\Delta\theta_d & \sin\Delta\theta_d \\ \sin\Delta\theta_d & \cos\Delta\theta_d \end{bmatrix} \quad (25)$$

$$\begin{bmatrix} -\sin\Delta\theta_m & -\cos\Delta\theta_m \\ \cos\Delta\theta_m & \sin\Delta\theta_m \end{bmatrix} = \begin{bmatrix} \sin(\Delta\theta_d - \Delta\theta_m) & -\cos(\Delta\theta_d + \Delta\theta_m) \\ \cos(\Delta\theta_d + \Delta\theta_m) & -\sin(\Delta\theta_d - \Delta\theta_m) \end{bmatrix}$$

Therefore, the following equation (26) can be finally obtained.

$$\begin{bmatrix} D_I(n+p) \\ D_Q(n+p) \end{bmatrix} = \begin{bmatrix} \sin(\Delta\theta_d - \Delta\theta_m) & -\cos(\Delta\theta_d + \Delta\theta_m) \\ \cos(\Delta\theta_d + \Delta\theta_m) & -\sin(\Delta\theta_d - \Delta\theta_m) \end{bmatrix} \begin{bmatrix} S_I(n+p) \\ S_Q(n+p) \end{bmatrix} \quad (26)$$

This can be expressed in the following equations (27).

$$\begin{cases} D_I(n+p) = \sin(\Delta\theta_d - \Delta\theta_m)S_I(n+p) - \cos(\Delta\theta_d + \Delta\theta_m)S_Q(n+p) \\ D_Q(n+p) = \cos(\Delta\theta_d + \Delta\theta_m)S_I(n+p) - \sin(\Delta\theta_d - \Delta\theta_m)S_Q(n+p) \end{cases} \quad (27)$$

The two equations (19) in the previous case in which the phase rotation is not carried out are added, the following four equations (28) can be obtained.

$$\begin{cases} D_I(n) = \cos(\Delta\theta_d - \Delta\theta_m)S_I(n) + \sin(\Delta\theta_d + \Delta\theta_m)S_Q(n) \\ D_Q(n) = \sin(\Delta\theta_d + \Delta\theta_m)S_I(n) + \cos(\Delta\theta_d - \Delta\theta_m)S_Q(n) \\ D_I(n+p) = \sin(\Delta\theta_d - \Delta\theta_m)S_I(n+p) - \cos(\Delta\theta_d + \Delta\theta_m)S_Q(n+p) \\ D_Q(n+p) = \cos(\Delta\theta_d + \Delta\theta_m)S_I(n+p) - \sin(\Delta\theta_d - \Delta\theta_m)S_Q(n+p) \end{cases} \quad (28)$$

At this time, the sum of the phase errors is expressed in the sin function and the cosine function and the difference therebetween is also expressed in the cosine function and the sin function. Accordingly, the sum of the phase errors satisfying both the sin function and the cosine function or the difference therebetween is restricted to only one value. As a result, it is possible to separate the phase error on the orthogonal modulator side from the phase error on the orthogonal demodulator side.

As described above, it is possible to separate the gain errors, the phase errors and the DC offsets in the orthogonal modulator and the orthogonal demodulator by using the phase rotating method. While the description has been given to the case in which the same types of errors are individually present, the separation can be carried out even if they are mixed. Moreover, it is also possible to estimate the gains of the orthogonal modulator and the orthogonal demodulator and the error of the phase rotating amount $\phi$ of the phase shifter. This will be described below.

As described above, the model in FIG. 18 results in a question for calculating nine error parameters, that is, $\Delta gm$, $\Delta\theta m$, $I_{DC}m$, $Q_{DC}m$, $G$, $\Delta gd$, $\Delta\theta d$, $I_{DC}d$ and $Q_{DC}d$ by the following equation (29).

$$\begin{bmatrix} D_I(n) \\ D_Q(n) \end{bmatrix} = \Psi_d \cdot \Phi(n) \cdot G \cdot \Psi_m \left( \begin{bmatrix} S_I(n) \\ S_Q(n) \end{bmatrix} + \begin{bmatrix} I_{DCm} \\ Q_{DCm} \end{bmatrix} \right) + \begin{bmatrix} I_{DCd} \\ Q_{DCd} \end{bmatrix} \quad (29)$$

This is "solution of multidimensional nonlinear simultaneous equations" or "multidimensional optimization" and can be solved by a numerical calculation. In general, it is hard to find an answer in a multidimensional question. In this question, a parameter to be obtained represents the error. Therefore, a true value of the answer can be nearly imagined and a value which can be an initial value, that is, a value having no error can be given.

The solution of the question has been described in detail in the Document "William H. Press, Saul A. Teukolsky, William T. Vetterling, Brian P. Flannery, "Numerical Recipes in C" Cambridge University Press (1988)", Chapter 9 (nonlinear simultaneous equations) and Chapter 10 (optimization).

Figure 21:
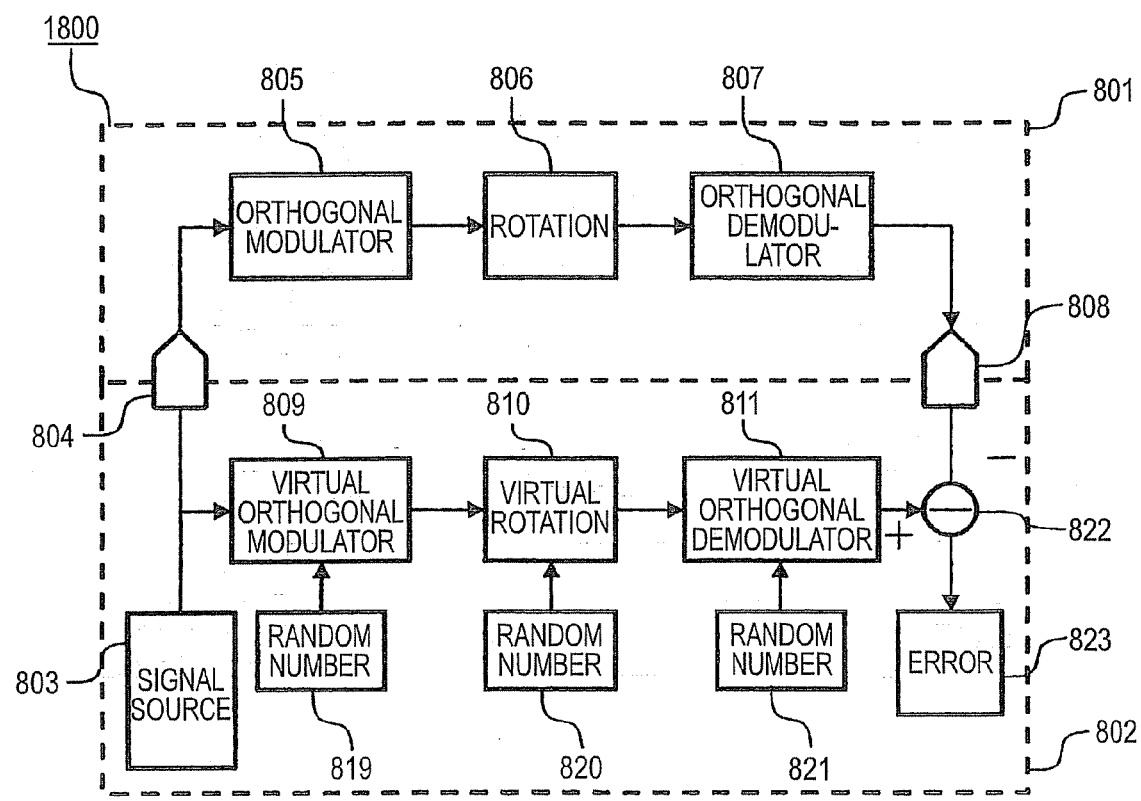
FIG. 21 is a diagram showing a parameter calculating model of the orthogonal error estimating portion.

An example for solving the equation (29) by the optimization using a random number will be described with reference to FIGS. 21, 22 and 23. FIG. 21 is a diagram showing a parameter calculating model, FIG. 22 is a flowchart showing a model solution, and FIG. 23 is a diagram showing a relationship between symbol points (which may be sample points) in accordance with the flowchart.

Figure 22:
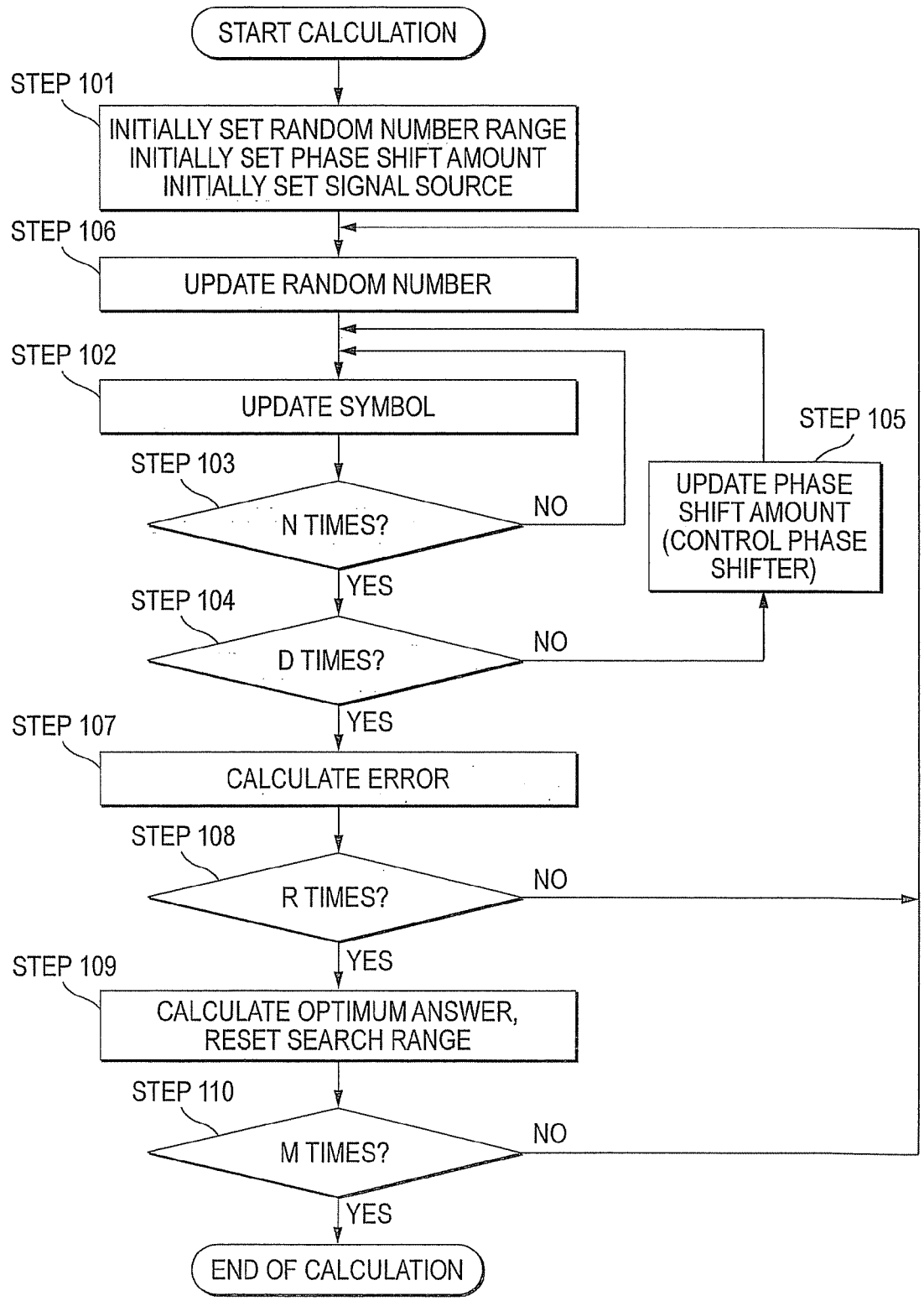
FIG. 22 is a flowchart for explaining an example of a solution of a model.
Figure 23:
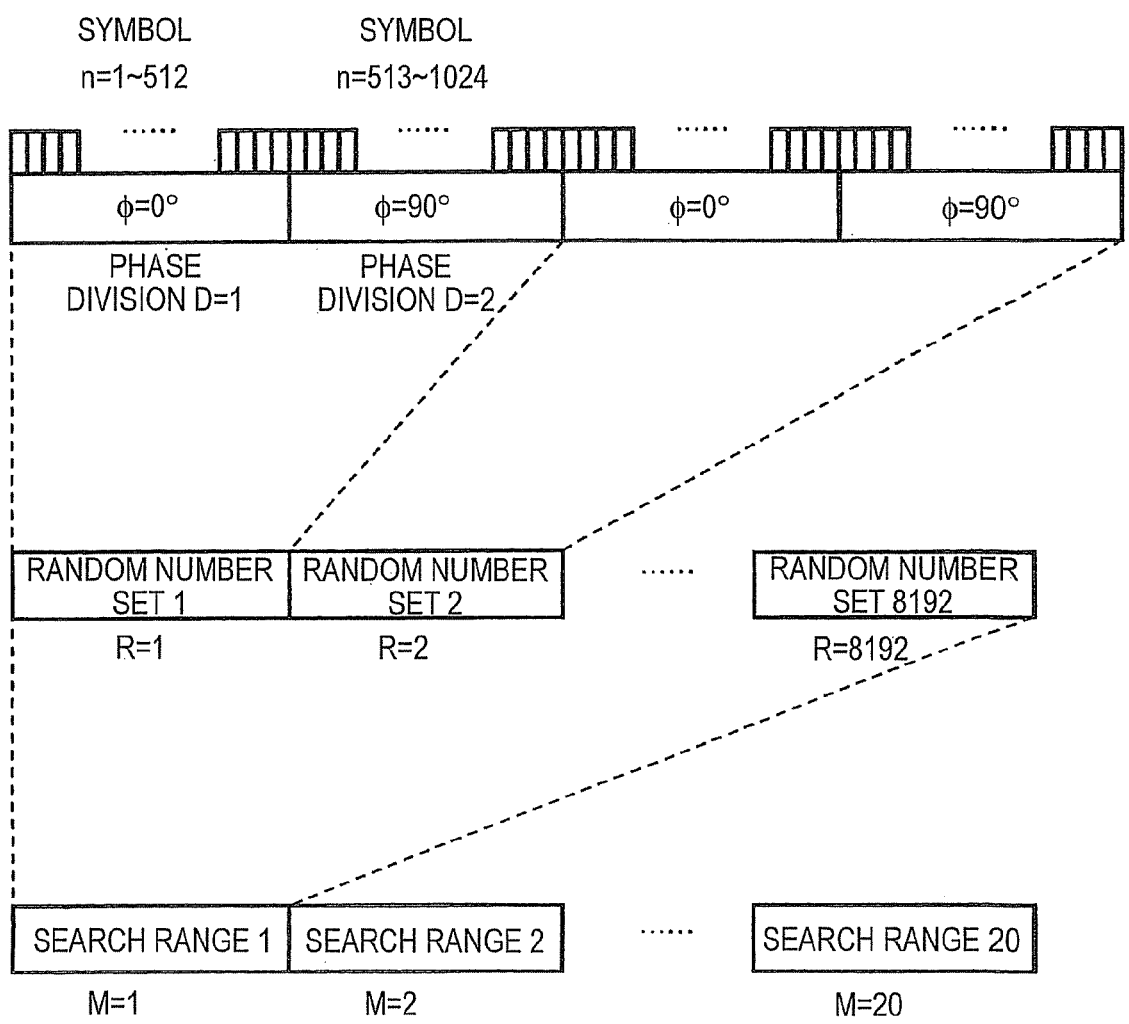
FIG. 23 is a diagram showing a relationship between samples according to the example of the solution of the model.
Figure 25A:
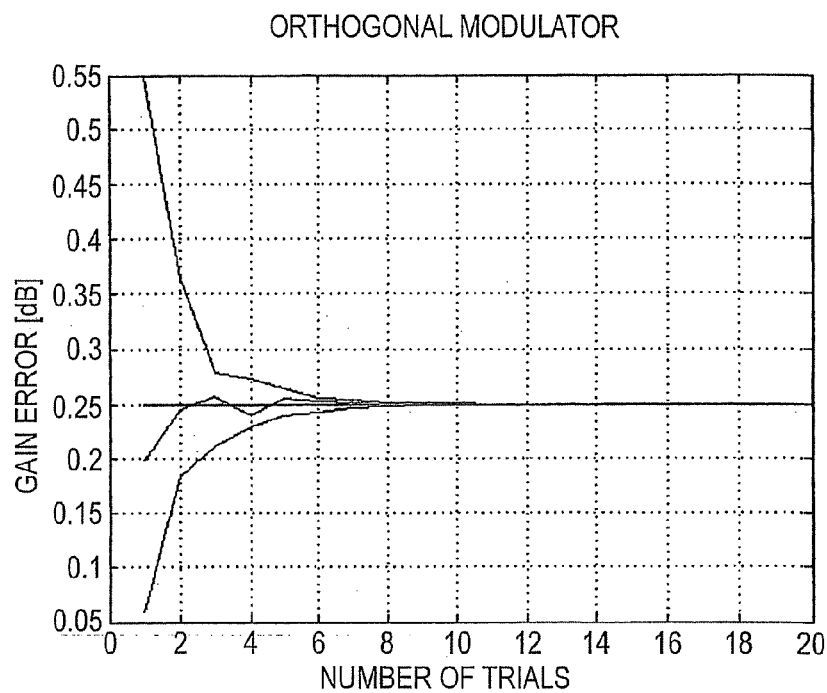
FIGS. 25A and 25B are charts showing a state of a convergence of a parameter (a gain error)
Figure 25B:
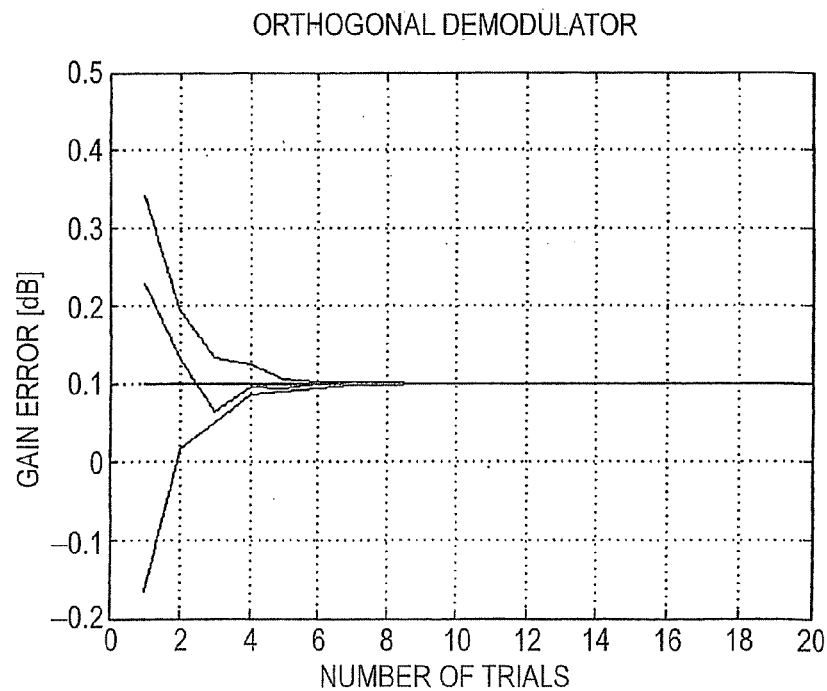
Figure 26A:
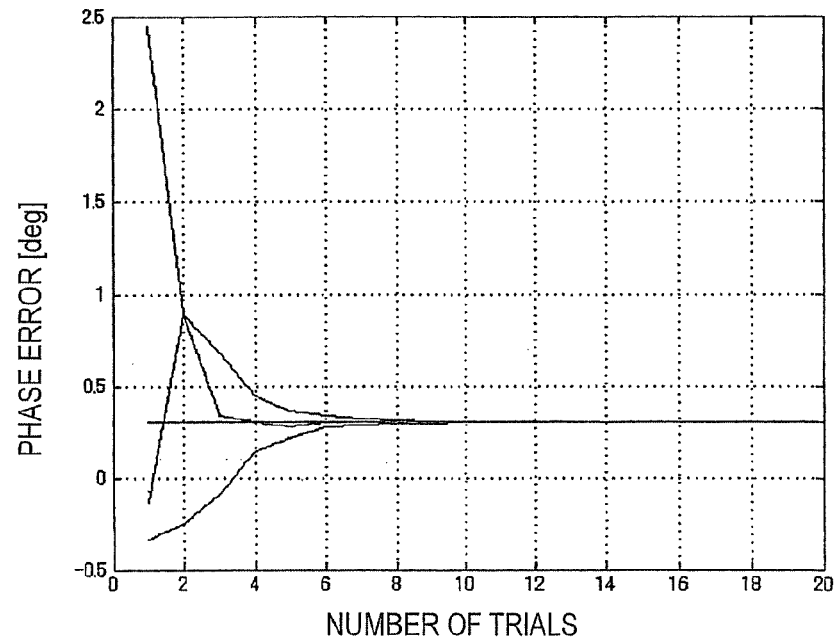
FIGS. 26A and 26B are charts showing a state of a convergence of a parameter (a phase error)
Figure 26B:
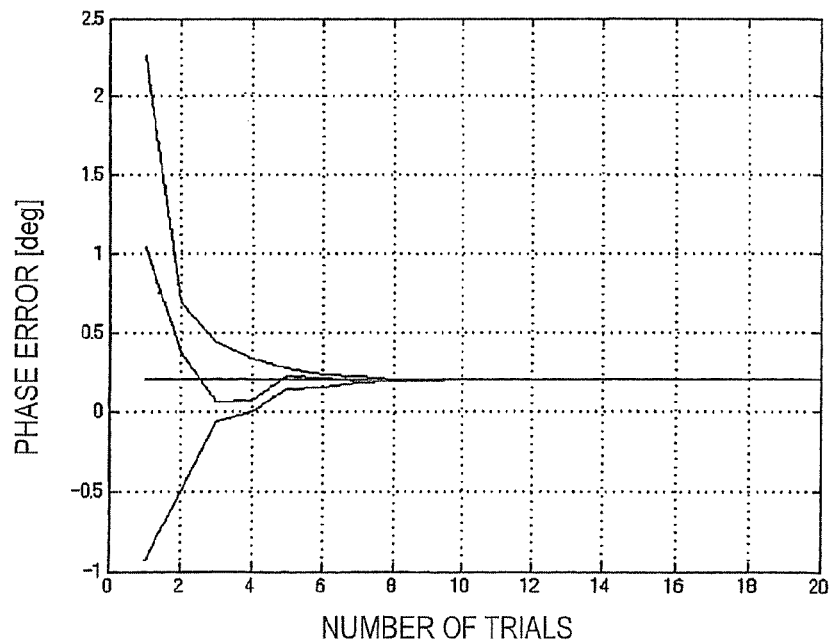
Figure 27A:
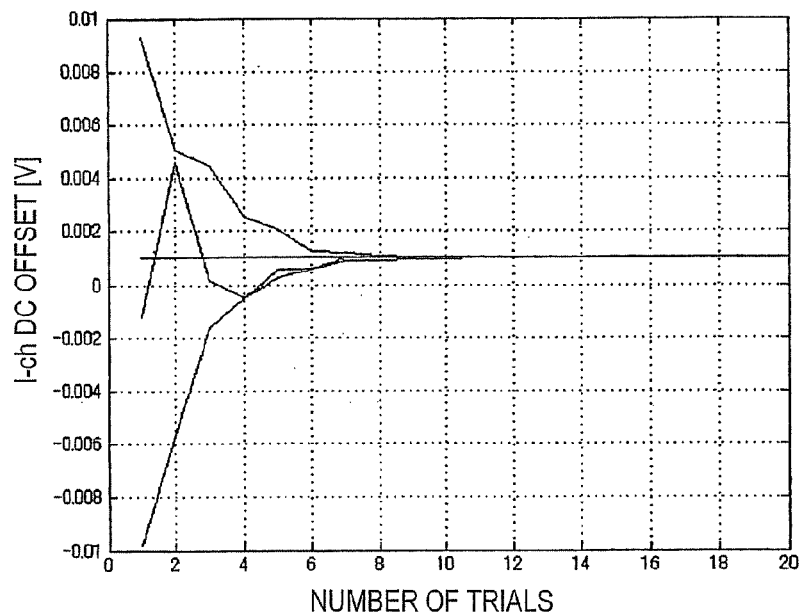
FIGS. 27A and 27B are charts showing a state of a convergence of a parameter (an Ich DC offset)
Figure 27B:
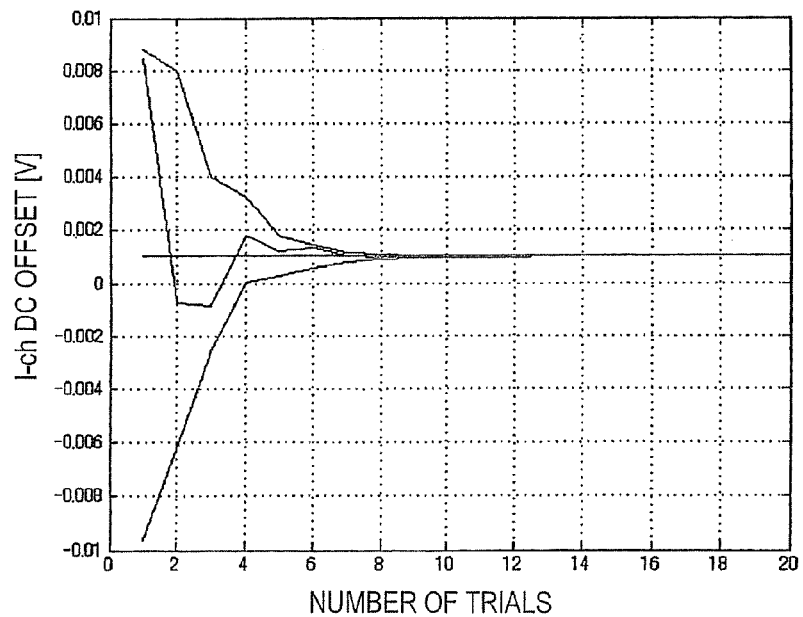
Figure 28A:
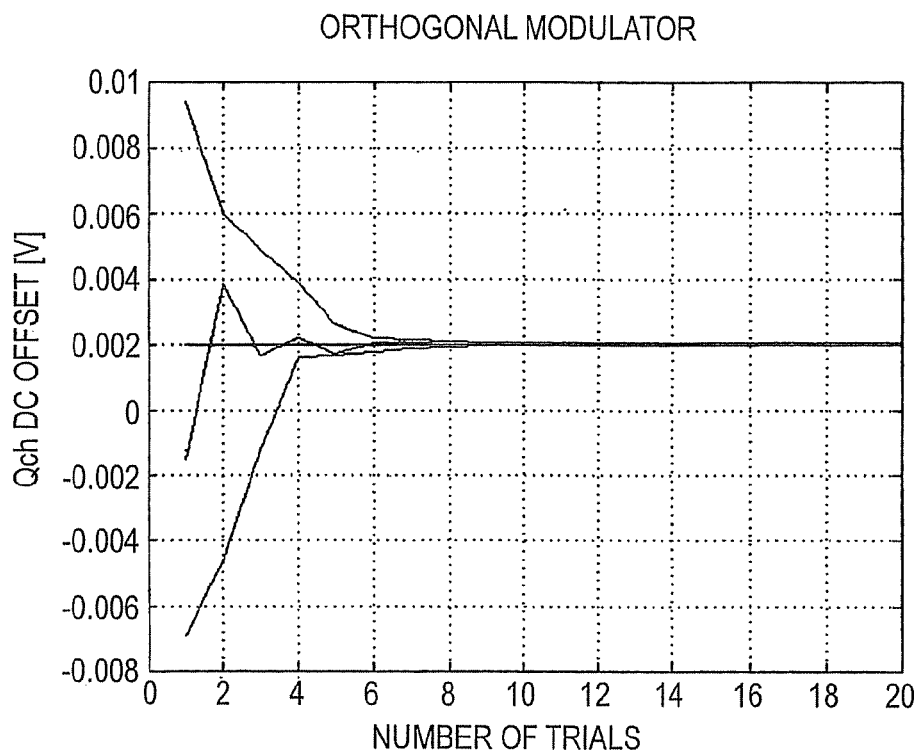
FIGS. 28A and 28B are charts showing a state of a convergence of a parameter (a Qch DC offset)
Figure 28B:
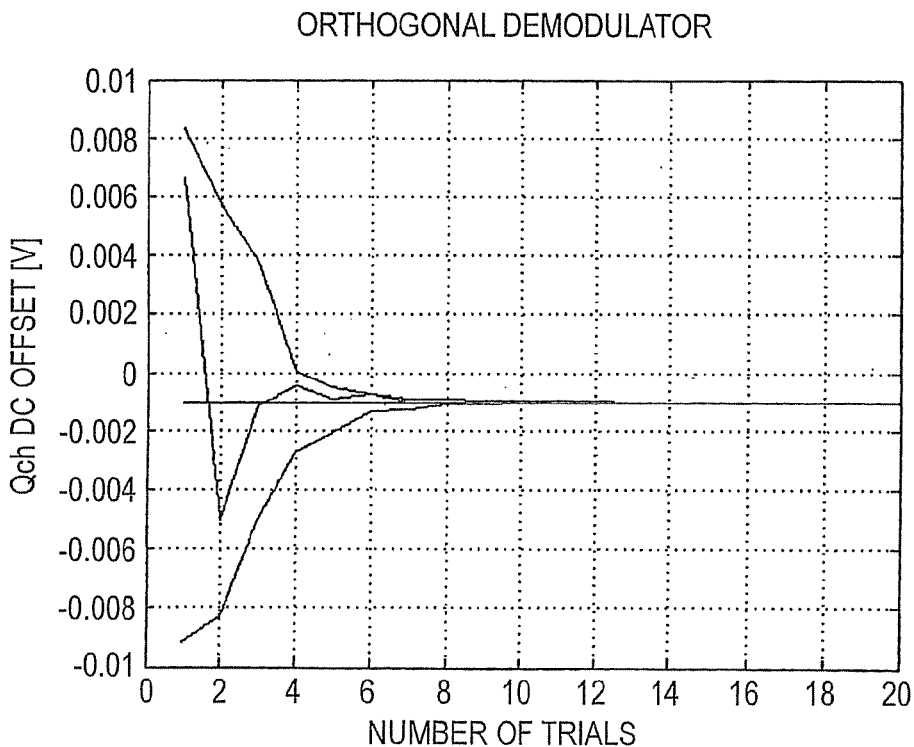
Figure 29:
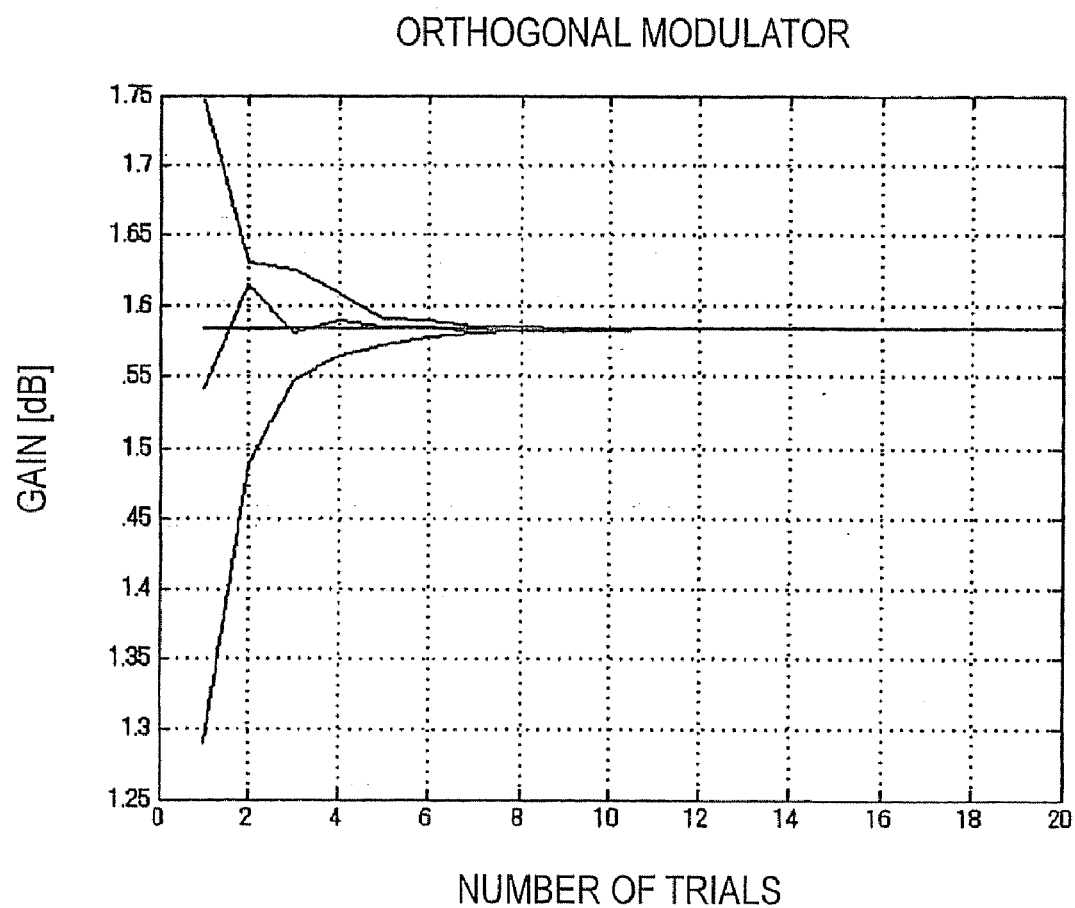
FIG. 29 is a chart showing a state of a convergence of a parameter (a QMOD gain)

First, initial values of the nine error parameters are given by random numbers (Step 101 in FIG. 22). A homogeneous random number is used as the random number. It is assumed that a range of the homogeneous random number is initialized for each parameter.

By using a temporary parameter generated by the random number, next, the following equation (30) is solved for N symbols (for example, 1024).

$$\begin{bmatrix} D_I(n) \\ D_Q(n) \end{bmatrix} = \Psi_d \cdot \Phi(n) \cdot G \cdot \Psi_m \left( \begin{bmatrix} S_I(n) \\ S_Q(n) \end{bmatrix} + \begin{bmatrix} I_{DCm} \\ Q_{DCm} \end{bmatrix} \right) + \begin{bmatrix} I_{DCd} \\ Q_{DCd} \end{bmatrix} \quad (30)$$

It is assumed that the phase rotating amount $\phi$ gives 0 degree and 90 degrees in the former 512 symbols of $1 \leq n \leq 512$ and the latter 512 symbols of $513 \leq n \leq 1024$. More specifically, the following equations (31) are set.

$$\begin{cases} \begin{bmatrix} D_I(n) \\ D_Q(n) \end{bmatrix} = \Psi_d \cdot \begin{bmatrix} 1 & 0 \\ 0 & 1 \end{bmatrix} \cdot G \cdot \Psi_m \left( \begin{bmatrix} S_I(n) \\ S_Q(n) \end{bmatrix} + \begin{bmatrix} I_{DCm} \\ Q_{DCm} \end{bmatrix} \right) + \begin{bmatrix} I_{DCd} \\ Q_{DCd} \end{bmatrix}, & (1 \leq n \leq 512) \\ \begin{bmatrix} D_I(n) \\ D_Q(n) \end{bmatrix} = \Psi_d \cdot \begin{bmatrix} 0 & -1 \\ 1 & 0 \end{bmatrix} \cdot G \cdot \Psi_m \left( \begin{bmatrix} S_I(n) \\ S_Q(n) \end{bmatrix} + \begin{bmatrix} I_{DCm} \\ Q_{DCm} \end{bmatrix} \right) + \begin{bmatrix} I_{DCd} \\ Q_{DCd} \end{bmatrix}, & (513 \leq n \leq 1024) \end{cases} \quad (31)$$

First, a baseband signal for an n-th symbol is generated from a signal source 803 in FIG. 21 (which corresponds to a transmitting signal generating portion 406) (Step 102 in FIG. 22). The baseband signal is input to an analog portion 801 through a DA converter 804 (which corresponds to the DACs 201 and 202) and is input to an orthogonal modulator 805 to be a compensating object (which corresponds to the orthogonal modulator 230).

In FIG. 1, a signal output from the orthogonal modulator 230 is input to the orthogonal demodulator 240 via the PA 208. At this time, a rotation $\phi$ of the phase planes of the orthogonal modulator 230 and the orthogonal demodulator 240 for an n-th sample is applied by the phase shifter 220. In FIG. 21, this is expressed as a rotation 806. A signal to which the rotation is applied is changed into a baseband signal by the orthogonal demodulator 807 and is returned to a digital signal via an AD converter 808 (which corresponds to the ADCs 217 and 218).

On the other hand, the baseband signal (corresponding to $I_2$ and $Q_2$) generated in the signal source 803 and a digital baseband signal (corresponding to $I_4$ and $Q_4$) returned via the AD converter 808 are fetched in to the orthogonal error estimating portion 403 in FIG. 1. A delay time is estimated and compensated, and a signal having a time aligned is transmitted to the parameter calculating portion 603. In the parameter calculating portion 603 in FIG. 4, a result of a calculation of a path for a serial connection of a virtual orthogonal modulator 809, a virtual rotation 810 and a virtual orthogonal demodulator 811 which are shown in FIG. 21 is compared with a result of a measurement in a cascade connection of the actual orthogonal modulator 805, the actual rotation 806 and the actual orthogonal demodulator 807, thereby estimating a parameter. For a calculation of a virtual path, the equations (31) are used.

In a stage in which the observation of a predetermined number N of symbols (Step 103 in FIG. 22) and a number of phase divisions D (Step 104 in FIG. 22) is ended, the equations (31) are evaluated (Step 107 in FIG. 22). In Step 106 of FIG. 22, the equations (31) are calculated by using random numbers 819 and 821 which are determined. The phase rotation φ is changed to alternately take D values (for example, two values of 0 degree and 90 degrees) every 512 symbols by the control portion 405 (Step 105 in FIG. 22).

Outputs DI(n) and DQ(n) for SI(n) and SQ(n) corresponding to $I_2$ and $Q_2$ are obtained in the equations (31). For example, 1024 symbols of DI (n) and DQ(n) are obtained and errors from $I_4$ and $Q_4$ obtained by adding a time to them are acquired. The error is calculated as follows.

$$Err(r) = \frac{1}{N}\sum_{n=1}^{N} |(D_I(n) + jD_Q(n)) - (I_4(n+\tau) + jQ_4(n+\tau))|^2 \quad (32)$$

In this case, N=1024 is set.

The same evaluation is repeated R times (for example, 8192 times) for another parameter set (Step 108 in FIG. 22).

In a stage in which the evaluation of the error for R times is ended, 16 of errors of Err(1) to Err(8192) are selected in order from the smallest one and random numbers set to the nine parameters of Δgm, Δθm, $I_{DC}$m, $Q_{DC}$m, G, Δgd, Δθd, $I_{DC}$d and $Q_{DC}$d are checked.

For example, if Δgm includes values of 0.18 dB to 0.36 dB in the 16 small errors, it is assumed that a solution of Δgm to be obtained is present within this range and a next random number setting range is limited to 0.18 dB to 0.36 dB. Referring to the other parameters, similarly, the check is carried out to update the random number setting range. For an estimation value of each parameter in this stage (an M-th time), a value set with a random number is given at a time that the errors of the Err(1) to Err(8192) are the smallest (Step 109 in FIG. 22). This processing is carried out M times (20 times, for example) (Step 110 in FIG. 22) and the processing is ended.

FIG. 24 shows a list of a set value for a parameter estimation. Moreover, FIGS. 25A to 29 show a state of a convergence of each parameter. In the drawings, in three lines, an uppermost line indicates an upper limit value of a homogeneous random number, a lowermost line indicates a lower limit value of the homogeneous random number, and a median line indicates an estimation value. Moreover, FIG. 30 shows a list of a convergence value of each parameter. From them, it is apparent that the nine error parameters can be converged reliably.

In the embodiment, the IQ planes of the orthogonal modulator and the orthogonal demodulator having the relationship of the cascade connection are rotated, thereby estimating their own errors. The estimation of the error results in the equation (32).

While the equation (29) is solved by the optimizing technique using the random number in the embodiment, this is not restricted but it is apparent that the multidimensional nonlinear equations may be solved by any method.

While the phase shifter is controlled every 512 samples in the embodiment, moreover, the error can be estimated even if N samples and data on R random number sets are previously acquired and the phase shifter is then controlled to carry out the same processing with different φ. Order for preparing the simultaneous equations (31) is a problem and it is not necessary to describe that the answer is prevented from being changed depending on the order.

Figures 31, 32:
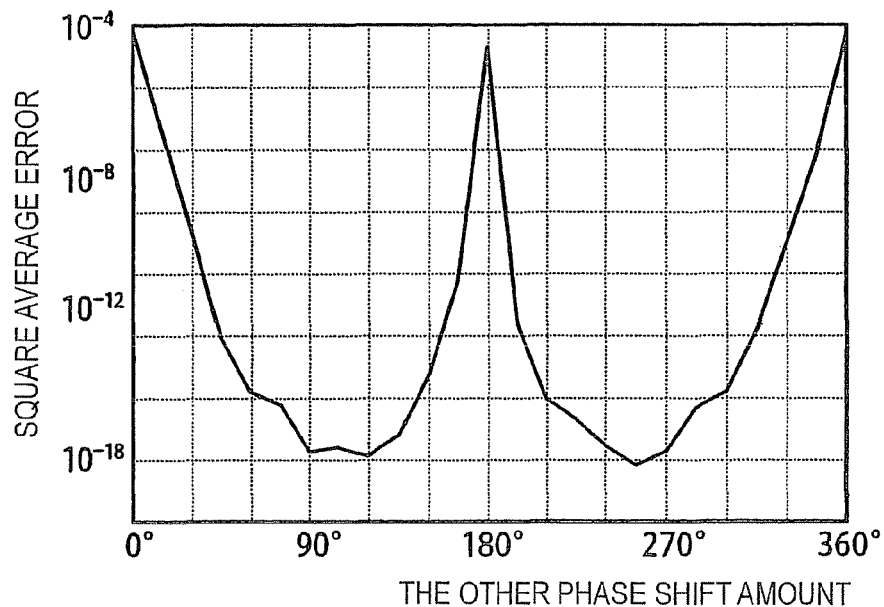
FIG. 31 is a table showing a relationship between a number of divisions D of a phase angle $\phi$ and a convergent characteristic.
FIG. 32 is a chart showing a relationship between one of phase shift amounts and a residual error in the case in which the other phase shift amount is 0 degree.

In the embodiment, two types of 0 degree and 90 degrees are selected as the phase angles for the rotation through the phase shifter 220. However, it is not necessary to use the limited value as the phase angle. FIG. 31 shows an example of a result obtained by simulating a relationship between the number of divisions D of the phase angle φ and a convergent characteristic according to the embodiment. From FIG. 31, it is apparent that equal convergent characteristics are obtained in a division into two parts or more.

FIG. 32 shows which angle is effectively selected for one of the phase shift amounts when the other phase shift amount is 0 degree in the case in which the number of divisions at the phase angle φ is set to be D=2.

From FIG. 32, it is apparent that a square average error is small and a high convergent characteristic is obtained when a shift of ±90 degrees is relatively carried out for a first phase shift amount. However, it is apparent that the convergence is carried out with the other values. A region around ±115 degrees is converged most easily. It is apparent that a practical region includes a wide range excluding 0 degree ±15 degrees and 180 degrees ±5 degrees.

Figure 33:
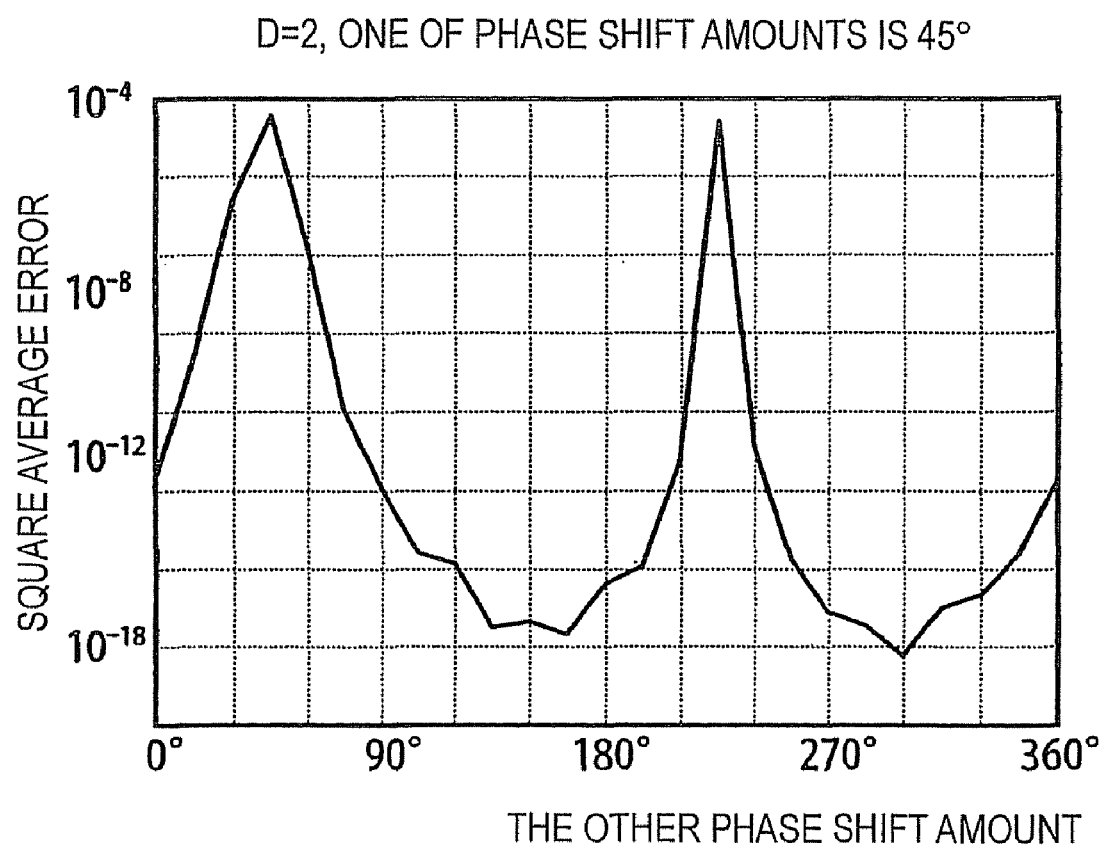
FIG. 33 is a chart showing a relationship between one of the phase shift amounts and the residual error in the case in which the other phase shift amount is 45 degrees.

FIG. 33 shows which angle is effectively selected as one of the phase shift amounts when the other phase shift amount is 45 degrees in the case in which the number of divisions at the phase angle φ is set to be D=2. In the same manner as in the example of FIG. 32, it is apparent that an effective angle for a second phase angle includes a region of ±15 degrees with respect to the first phase angle and a region of +180 degrees ±5 degrees with respect to the first phase angle.

The characteristic represents that the phase between the orthogonal modulator and the orthogonal demodulator which is hard to carry out a practically strict regulation does not need to be limited to a specific value of 0 degree or 90 degrees.

In the description, it is assumed that the phase angle φ is set to have a strictly controlled value. More specifically, it is assumed that the phase shifter 220 accurately shifts the phases of the IQ planes of the orthogonal modulator 230 and the orthogonal demodulator 240 to 45 degrees if the control portion 405 sets the phase angle φ to be 45 degrees. However, a method of requiring such a calibration is practically unpreferable, and it is desirable that an estimating algorithm should be operated even if the phase angle φ of the IQ plane set by the phase shifter 220 has an error.

As shown in FIG. 21, therefore, the error parameter Δφ (the random number 820) is also set to the phase angle φ. Consequently, it is possible to estimate nine other error parameters while estimating the error of the phase angle φ together with the nine other error parameters. In particular, a convergence can be carried out even if a search range of ±180 is set to be Δφ. This corresponds to an increase of an unknown by one in multidimensional nonlinear simultaneous equation (29).

The characteristic is very practically. The strict calibration of the phase shifter 220 does not need to be carried out. Therefore, it is not necessary to pay attention to an electric length from a local signal source to the orthogonal modulator or the orthogonal demodulator, for example. Moreover, it is not necessary to pay attention to the linearity of the amount of the phase shift for the electric length and the control voltage of the phase shifter.

While the homogeneous random number may be used for the random number in the description, this may be a Gaussian random number.

Figure 34:
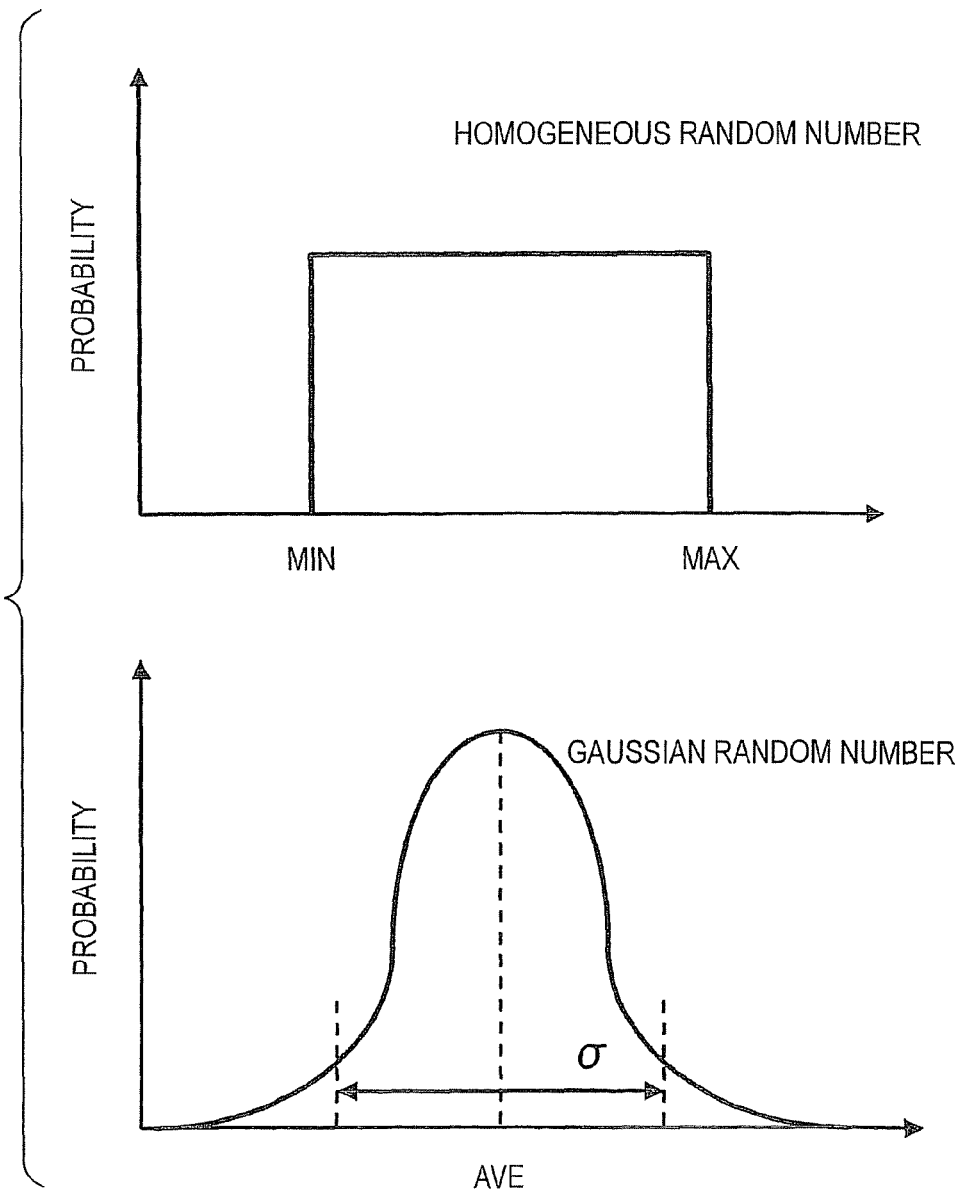
FIG. 34 is a chart showing a probability distribution of two random numbers.

FIG. 34 shows a probability of two random numbers. The homogeneous random number is generated between maximum and minimum values set as the search range. For this reason, there is a problem in that the convergence is not carried out if a true value departs from the range.

On the other hand, the Gaussian random number can apply a research onto the outside of a fixed search range at a low probability by setting the search range to be σ. Therefore, the method is apparently robust as compared with the homogeneous random number. A convergent characteristic is not very different from that in the homogeneous random number.

Thus, the advantages of the embodiment are not restricted to the solution of the multidimensional nonlinear simultaneous equations. Therefore, it is possible to optionally change the searching method.

While a noise generated in a practical use has been disregarded in the description, the calculation model resistant to the noise will be also given.

A calculation model having the noise is expressed in following equation (33).

$$\begin{bmatrix} D_I(n) \\ D_Q(n) \end{bmatrix} = \Psi_d \cdot \Phi(n) \cdot G \cdot \Psi_m \left( \begin{bmatrix} S_I(n) \\ S_Q(n) \end{bmatrix} + \begin{bmatrix} I_{DCm} \\ Q_{DCm} \end{bmatrix} \right) + \begin{bmatrix} I_{DCd} \\ Q_{DCd} \end{bmatrix} + \begin{bmatrix} \xi_I \\ \xi_Q \end{bmatrix} \quad (33)$$

Symbol $\xi$ represents a noise loaded into each channel. In a state in which the fluctuation is present, the estimating algorithm is executed.

Consequently, an estimation value does not converge to be a certain value or less under the influence of the noise. For example, it is assumed that the convergence is ended in an estimation of M=10 times. In this case, it is possible to further carry out the convergence toward a true value by performing an average processing for estimation values at 11 times and thereafter.

More specifically, an average value of the estimation values for 11 and 12 times is set at the 12 time and an average value of the estimation values for 11, 12 and 13 times is set at the 13 time.

By repeating the processing, it is possible to converge the parameter.

In the description, the nonlinearity of the PA 208 has not been taken into consideration. In some cases, however, the PA 208 is used in the nonlinear region in an actual communicating apparatus. In this case, a threshold is provided for a signal amplitude, a smaller signal than the threshold is set to be the calculation object of the equation (29) and the equation (33), and a great value is cancelled. By this processing, it is possible to relieve the influence of the nonlinearity of the PA 208.

As an example for relieving the influence of the nonlinearity of the PA 208, the combined use with the DPD 401 can also be proposed.

In the method, an estimating operation of the DPD 401 and that of an orthogonal error compensation are alternately carried out and both a linear error and a nonlinear error are converged. Moreover, the relationship does not need to be always operated mechanically and alternately but may be operated independently. Events to be triggers of the respective estimating operations do not need to be common but may be independent. The event includes a timer, a counter, a change in a temperature, a change in a transmitting power, a change in a transmitting frequency, a change in an output power of the PA 208, a change in an input power of the PA 208, a gain of the PA 208, a gain of the orthogonal modulator 230, a change in an output power of the orthogonal modulator 230, a change in an input power of the orthogonal demodulator 240, a change in a gain of the orthogonal demodulator 240, a change in a power of an LO signal, a change in a frequency of the LO signal, an unlock of a PLL, a change in a combination of a transmitting channel in a multicarrier, and a change in a modulating method. Moreover, it is also possible to generate an event depending on the contents of received data and transmitted data.

In a state in which the DPD 401 is operated, the nonlinearity of the PA 208 is offset by the DPD 401. Accordingly, the orthogonal error estimating portion 403 compares $I_2$ and $Q_2$ with $I_4$ and $Q_4$ so that the nonlinearity can be removed. In this case, the orthogonal modulator error compensating portion 402 is interposed between paths. Therefore, the error of the orthogonal modulator error compensating portion 402 is also compensated. Apart shifted from the compensation is observed.

Similarly, the orthogonal error estimating portion 403 refers to the signals of $I_5$ and $Q_5$ so that the error of the orthogonal demodulator 240 is also compensated. Similarly, a part shifted from the compensation is observed.

Although the DPD 401, the transmitting signal generating portion 406 and the receiving signal processing portion 407 are not indispensable to the compensation of the orthogonal modulator 230 and the orthogonal demodulator 240, description will be particularly given to an example of a structure and an operation of the DPD 401.

Figure 35:
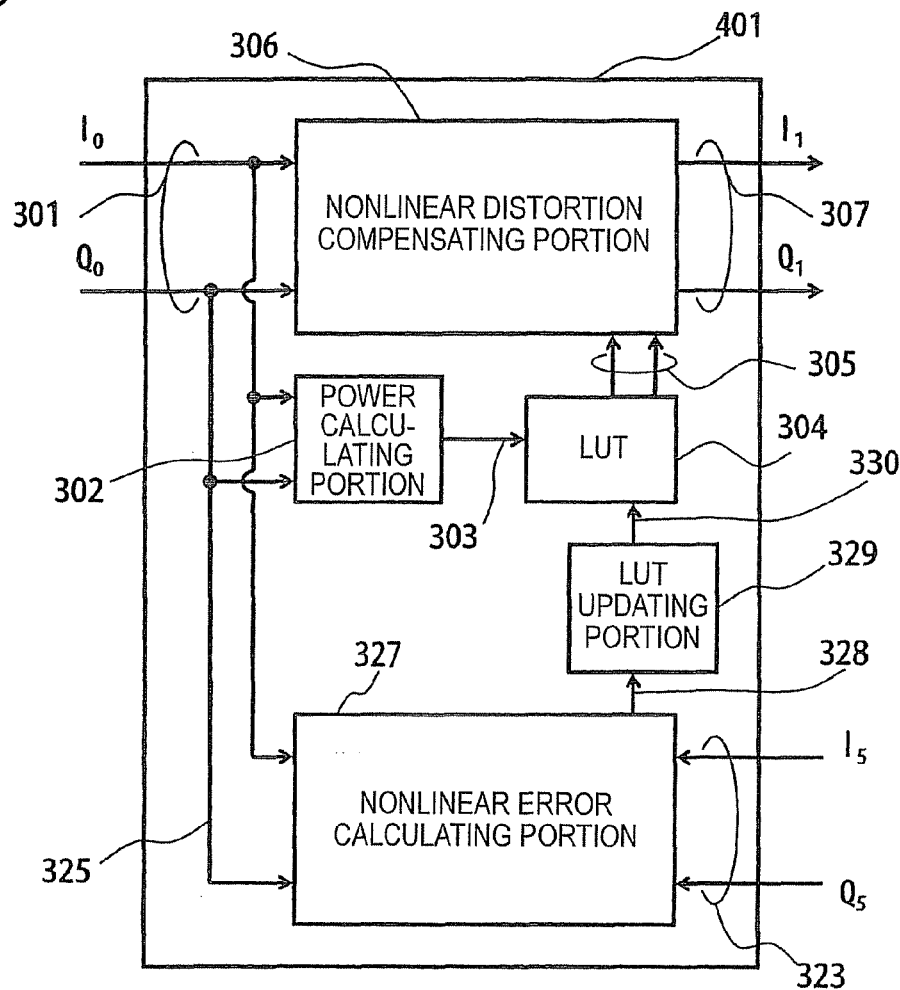
FIG. 35 is a block diagram showing a DPD.

As shown in FIG. 35, the DPD 401 includes a power calculating portion 302, an LUT 304 for a nonlinear distortion compensation, a nonlinear distortion compensating portion 306, a nonlinear error calculating portion 327 and an LUT updating portion 329.

For convenience of the description, moreover, designations will be given to a signal and a path thereof. More specifically, designations are given to an orthogonal baseband signal 301 represented by $I_0$ and $Q_0$, an amplitude value 303 calculated by the power calculating portion 302, nonlinear distortion compensation data 305 which are orthogonalized, an orthogonal baseband signal 307 subjected to a nonlinear distortion compensation which is represented by $I_1$ and $Q_1$, a return orthogonal baseband signal 323 represented by $I_5$ and $Q_5$, a nonlinear error 328 corresponding to a power calculated by the nonlinear error calculating portion 327, and nonlinear distortion compensation data 330 for an update which are to be newly written to an LUT address corresponding to a power by the LUT updating portion 329.

Description will be given to an operation in a transmitting mode in each block of the DPD 401.

First, the amplitude value 303 of the transmitting signal is calculated from the orthogonal baseband signal 301 through the power calculating portion 302. Next, the amplitude value 303 of the transmitting signal which is calculated is set to be address to refer to the LUT 304 for a nonlinear distortion compensation, thereby obtaining the nonlinear distortion compensation data 305 acquired by orthogonalizing the nonlinear distortion compensation data having a reverse characteristic to the nonlinear distortion characteristic of the transmitting system which is previously calculated.

The nonlinear distortion compensating portion 306 makes a complex product of the orthogonal baseband signal 301 and the nonlinear distortion compensation data 305 which are orthogonalized, and outputs the orthogonal baseband signal 307 subjected to the nonlinear distortion compensation.

In an error estimating mode, the return orthogonal baseband signal 323 and the orthogonal baseband signal 301 are compared with each other to model a nonlinear error of the transmitting system circuit 600 as a function of an amplitude of the orthogonal baseband signal 301, and furthermore, to update the LUT 304 in accordance with an instruction given from the control portion 405.

First, a delay generated between the orthogonal baseband signal 301 and the return orthogonal baseband signal 323 is estimated in the nonlinear error calculating portion 327 to correct a delay. The orthogonal baseband signal 301 and the return orthogonal baseband signal 323 which have the delay corrected are subjected to a complex division at the same time so that a complex gain of the transmitting system circuit 600 at that time is obtained. Next, the complex gain is represented as a function of the amplitude of the orthogonal baseband signal 301 at that time. The modeled result is sent as the nonlinear error 328 corresponding to the amplitude to the LUT updating portion 329. The LUT updating portion 329 carries out a conversion for setting the amplitude to be an address, and furthermore, an inverse function of the nonlinear error 328 is obtained to acquire the complex nonlinear distortion compensation data 330 corresponding to an amplitude (an LUT address) thereof. The update of the LUT 304 is executed in a timing which does not hinder a transmission in accordance with an instruction given from the control portion 405.

Consequently, it is possible to carry out a nonlinear distortion compensation with high precision in the transmitting mode.

It is apparent that the structure of the DPD 401 is not restricted to the structure. For example, the value to be calculated by the power calculating portion 302 is not restricted to an amplitude value but a power value of a transmitting signal may be calculated. More specifically, it is also possible to employ a structure in which the value is set to be an address, thereby referring to the LUT 304 for a nonlinear distortion compensation and the nonlinear distortion compensation data 305 are obtained by orthogonalizing the nonlinear distortion compensation data having the reverse characteristic to the nonlinear distortion characteristic of the transmitting system which is previously calculated. In addition to such a detailed respect, the skilled in the art can understand that a structure capable of correcting the nonlinearity is enough.

In the description, moreover, a connecting destination of the antenna 209 is switched to the transmitting system circuit 600 or the receiving system circuit 800 on a time basis by means of the switch 210. In this case, it is possible to use the receiving system circuit 800 as a feedback loop to be utilized for estimating an error as described above. Furthermore, it is apparent that a structure in which a plurality of antennas for the transmitting system circuit 600 and the receiving system circuit 800 are prepared and the switching is not carried out may be employed. In case of a receiving diversity type, two kinds of receiving system circuits 800 are provided. In this case, it is preferable that one of the systems should be constituted to be switchable into a connection/disconnection to/from the antenna and should be thus used as a feedback loop.

In a system for carrying out a transmission and a receipt at the same time, moreover, a transmitting frequency and a receiving frequency are different from each other. In this case, the receiving system circuit 800 cannot be used as the feedback loop. Therefore, it is preferable to provide a dedicated circuit to the feedback loop which serves to estimate an error.

The description has been given to the communicating apparatus of a direct conversion type in which the frequencies of LO signals of the orthogonal modulator 230 and the orthogonal demodulator 240 are set to be carrier frequencies. However, a heterodyne method for up-converting/down-converting the frequency of the LO signal as an intermediate frequency also can be used in the communicating apparatus. In that case, it is preferable that an up-converter/down-converter should share the frequency of the LO signal. A method of generating two IF signals having a complex conjugate relationship by a DA converter and causing them to pass through an orthogonal modulator, thereby suppressing an image, in which, the orthogonal modulator also can be corrected. In that case, baseband signals, which have not been subjected to complex mixing, will be compared. The method of suppressing an image is also effective for a receipt. Also in that case, the error compensation of the orthogonal demodulator in the same manner as described above will by applied effectively.

It is apparent that the structures of the orthogonal modulator and the orthogonal demodulator are not restricted to the way of combining the mixer and the phase shifter according to the embodiment but various known configurations can be taken.

A phase difference between a local signal to be supplied to the orthogonal modulator and a local signal to be supplied to the orthogonal demodulator is not restricted to the structure according to the embodiment in which a phase of a signal to be sent from a local signal source to one of them is shifted. For example, it is also possible to employ a structure in which a phase of a signal to be sent to the other is also shifted and a structure in which two local signal sources are provided independently to shift both of the phases, respectively.

Referring to the orthogonal modulator error correcting portion 402, for example, it is also possible to employ a structure in which the adder 501 adds a DC offset control voltage to a signal passing through an amplifier.

Figure 36:
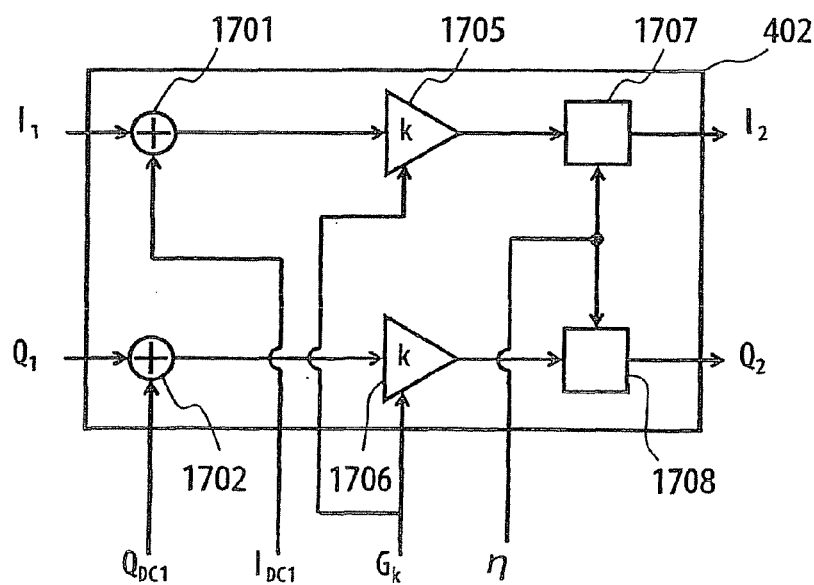
FIG. 36 is a block diagram showing a variant of the orthogonal modulator error compensating portion.

The orthogonal modulator error compensating portion 402 may have such a structure as to provide adders 1701 and 1702, amplifiers 1705 and 1706, and phase shifters 1707 and 1708 as shown in FIG. 36, for example. The adder 1701 adds $I_1$ to be input to a DC offset controlling voltage IDC1 to be controlled by the control portion 405, and outputs a signal thus obtained. The amplifier 1705 amplifies a signal output from the adder 1701 at an amplification factor k to be controlled by the control portion 405 and outputs a signal thus obtained. The phase shifter 1701 shifts a phase of a signal output from the amplifier 1705 by a phase shift amount η to be controlled by the control portion 405 and outputs $I_2$. The adder 1702 adds $Q_1$ to be input to a DC offset controlling voltage QDC1 to be controlled by the control portion 405 and outputs a signal thus obtained. The amplifier 1706 amplifies a signal output from the adder 1702 at the amplification factor k to be controlled by the control portion 405 and outputs a signal thus obtained. The phase shifter 1708 shifts a phase of a signal output from the amplifier 1706 by the phase shift amount η to be controlled by the control portion 405 and outputs $Q_2$. In this case, the following equation (34) can be used for a model equation representing an input/output relationship of the orthogonal modulator in place of equation (1).

$$\begin{bmatrix} I_2 \\ Q_2 \end{bmatrix} = \begin{bmatrix} k_1\cos\eta & k_1\sin\eta \\ k_1\sin\eta & k_1\cos\eta \end{bmatrix} \left( \begin{bmatrix} I_1 \\ Q_1 \end{bmatrix} + \begin{bmatrix} I_{DC1} \\ Q_{DC1} \end{bmatrix} \right) \quad (34)$$

By using the same structure for the orthogonal demodulator, the following equation (35) is used for calculating a parameter in the orthogonal error estimating portion in place of the equation (4).

$$\begin{bmatrix} k_2\cos\eta & k_2\sin\eta \\ k_2\sin\eta & k_2\cos\eta \end{bmatrix} \quad (35)$$

$$\left( \begin{bmatrix} \cos\frac{\Phi}{2} & \sin\frac{\Phi}{2} \\ \sin\frac{\Phi}{2} & \cos\frac{\Phi}{2} \end{bmatrix} \begin{bmatrix} k_1\cos\eta & k_1\sin\eta \\ k_1\cos\eta & k_1\cos\eta \end{bmatrix} \left( \begin{bmatrix} I_1 \\ Q_1 \end{bmatrix} + \begin{bmatrix} I_{DC1} \\ Q_{DC1} \end{bmatrix} \right) + \begin{bmatrix} I_{DC2} \\ Q_{DC2} \end{bmatrix} \right) - \begin{bmatrix} I_5 \\ Q_5 \end{bmatrix} = 0.$$

In the embodiment, the sampling is carried out in 16 LO phase differences and the symbol pattern is then changed, which is a suitable technique for the case in which a symbol rate is low. In the case in which the symbol rate is high, conversely, it is preferable to change the LO phase difference after carrying out the sampling in four symbol patterns.

The error of the orthogonal modulator 230 and that of the orthogonal demodulator 240 which are obtained as described above are set to the orthogonal modulator error compensating portion 402 and the orthogonal demodulator error compensating portion 404 respectively and the orthogonal errors are offset.

As described above, the calculation model (FIG. 15) of the orthogonal modulator 230 has a reverse structure to the structure of the orthogonal modulator error compensating portion in FIG. 2. Accordingly, a sign of the DC offset amount is reversed to that of the DC offset amount of the orthogonal modulator and the DC offset amount is thus set to the orthogonal modulator error compensating portion 402. Referring to the amplitude error and the phase error of the orthogonal modulator 230, moreover, it is preferable that an inverse matrix to a matrix ψm should be obtained and given to a matrix g of the orthogonal modulator error compensating portion.

Referring to the orthogonal demodulator 240, the error compensation is carried out by the same operation.

Thus, the orthogonal modulator error compensating portion having a reverse structure to the calculation model (FIG. 15) of the orthogonal modulator 230 is provided. Consequently, it is possible to easily obtain a parameter for off setting errors and to control a calculation error in a conversion thereof. The orthogonal demodulator is the same.

While there are provided the calculation model and the compensator in which the orthogonal modulator and the orthogonal demodulator have reverse structures to each other in the embodiment, it is also possible to have a relationship in which the orthogonal modulator side and the orthogonal demodulator side have the same structures or to use a model in which they are completely different from each other. A model capable of expressing a characteristic of an analog portion to be a compensating object more efficiently or accurately is to be used for the calculation model of the orthogonal modulator. Moreover, it is desirable that a mathematically reverse model to the model should be set up.

According to the embodiments of the present invention, it is possible to divide and compensate a nonlinearity and errors of an orthogonal modulator and an orthogonal demodulator even if there is employed a structure in which a feedback system is shared by a DPD and an orthogonal error compensating circuit.

What is claimed is:

1. A communicating apparatus comprising:
   a local signal generator that generates a first local signal having a first phase and a second local signal having a second phase that is different from the first phase, the local signal generator being configured to change a phase difference between the first and second phases;
   an orthogonal modulator that modulates an input signal into a modulation signal by using the first local signal;
   a first compensator that corrects an orthogonal modulation error generated in the orthogonal modulator;
   an orthogonal demodulator that demodulates the modulation signal into a demodulation signal by using the second local signal;
   a second compensator that corrects an orthogonal demodulation error generated in the orthogonal demodulator; and
   a compensation controller that calculates a first set value to be set to the first compensator and a second set value to be set to the second compensator based on:
      (1) the phase difference;
      (2) the input signal; and
      (3) the demodulation signal,
   wherein the compensation controller calculates the first and second set values by use of a model including:
      an imaginary modulator modeling the orthogonal modulator;
      an imaginary rotation modeling the phase difference of the local signal generator; and
      an imaginary demodulator modeling the orthogonal demodulator, and
   wherein the compensation controller refers the imaginary rotation as a parameter including an error.

2. The apparatus according to claim 1, wherein the compensation controller obtains the first set value and the second set value by the use of:
   a relationship between the input signal and the demodulation signal when the phase difference is a first phase difference; and
   a relationship between the input signal and the demodulation signal when the phase difference is a second phase difference that is different from the first phase difference.

3. The apparatus according to claim 2, wherein a difference between the first phase difference and the second phase difference is 90 degrees.

4. The apparatus according to claim 2, wherein a difference between the first phase difference and the second phase difference is in a range from 15 degrees to 175 degrees.

5. The apparatus according to claim 2, wherein a difference between the first phase difference and the second phase difference is in a range from 185 degrees to 345 degrees.

6. The apparatus according to claim 1, wherein the local signal generator includes:
   a basic local signal generator that generates the first local signal; and
   a phase shifter that generates the second local signal by shifting a phase of the first local signal.

7. A communicating apparatus comprising:
   a local signal generator that generates a first local signal having a first phase and a second local signal having a second phase that is different from the first phase;
   an orthogonal modulator that modulates an input signal into a modulation signal by using the first local signal;
   a first compensator that corrects orthogonal modulation error generated in the orthogonal modulator;
   an orthogonal demodulator that demodulates the modulation signal into a demodulation signal by using the second local signal;
   a second compensator that corrects an orthogonal demodulation error generated in the orthogonal demodulator;
   a compensation controller that calculates a first set value to be set to the first compensator and a second set value to be set to the second compensator based on:
      (1) a phase difference between the first phase and the second phase;
      (2) the input signal;
      (3) the demodulation signal; and
   a nonlinear distortion compensator that obtains a nonlinear distortion compensation characteristic from an output signal output by the second compensator and a first original signal, and that supplies a second original signal obtained by performing a nonlinear distortion compensation over the first original signal with the nonlinear compensation characteristic to the first compensator;

wherein the first compensator performs an orthogonal error correction over the second original signal to output the input signal.

8. A method for calculating a set value for an orthogonal error compensation in a communicating apparatus, wherein the communicating apparatus comprises, an orthogonal modulator that modulates an input signal into a modulation signal by using a first local signal having a first phase;

a first compensator that corrects orthogonal modulation error generated in the orthogonal modulator;

an orthogonal demodulator that demodulates the modulation signal into a demodulation signal by using a second local signal having a second phase that is different from the first phase; and a second compensator that corrects an orthogonal demodulation error generated in the orthogonal demodulator, the method comprising:

acquiring the input signal and the demodulation signal when a phase difference between the first phase and the second phase is set to a first phase difference;

acquiring the input signal and the demodulation signal when the phase difference is set to a second phase difference that is different from the first phase difference;

calculating a first set value and a second set value by the use of at least:
  (1) the input signal and the demodulation signal when the phase difference is the first phase difference,
  (2) the input signal and the demodulation signal when the phase difference is the second phase difference; and setting the first set value to the first compensator and the second set value to the second compensator; and wherein the first and second set values are calculated by use of a model including:
  an imaginary modulator modeling the orthogonal modulator;
  an imaginary rotation modeling the phase difference of the local signal generator; and
  an imaginary demodulator modeling the orthogonal demodulator.

9. The method according to claim 8, wherein the calculating step comprises calculating the first set value and the second set value by use of:
  (1) the input signal and
  (2) an output signal output by the second compensator.

10. A computer program product for enabling a computer system to perform an orthogonal error compensation, wherein the computer system comprises:

a local signal generator that generates a first local signal having a first phase and a second local signal having a second phase that is different from the first phase;

an orthogonal modulator that modulates an input signal into a modulation signal by using the first local signal;

a first compensator that corrects orthogonal modulation error generated in the orthogonal modulator;

an orthogonal demodulator that demodulates the modulation signal into a demodulation signal by using the second local signal;

a second compensator that corrects an orthogonal demodulation error generated in the orthogonal demodulator; and a compensation controller that obtains a first set value to be set to the first compensator and a second set value to be set to the second compensator, based on at least a relationship between the input signal and the demodulation signal, the computer program product comprising:

software instructions for enabling the computer system to perform predetermined operations; and a computer readable medium (non-transitory) for storing the software instructions;

wherein the predetermined operations comprises:

giving a first phase difference as a phase difference between the first phase and the second phase;

acquiring the input signal and the demodulation signal, when the phase difference is the first phase difference;

giving a second phase difference as the phase difference, the second phase difference is different from the first phase difference;

acquiring the input signal and the demodulation signal, when the phase difference is the second phase difference;

calculating the first set value and the second set value, based on at least:
  (1) the input signal and the demodulation signal when the phase difference is the first phase difference,
  (2) the input signal and the demodulation signal when the phase difference is the second phase difference; and setting the first set value to the first compensator and the second set value to the second compensator; and wherein the first and second set values are calculated by use of a model including:
  an imaginary modulator modeling the orthogonal modulator;
  an imaginary rotation modeling the phase difference of the local signal generator; and
  an imaginary demodulator modeling the orthogonal demodulator.

11. The computer program product according to claim 10, wherein the calculating step calculates the first set value and the second set value by use of;
  (1) the input signal and
  (2) an output signal output by the second compensator.

* * * * *